(12) United States Patent
Murade

(10) Patent No.: US 7,113,245 B2
(45) Date of Patent: Sep. 26, 2006

(54) ELECTRO-OPTICAL DEVICE COMPRISING A PRECHARGE CIRCUIT

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 75 days.

(21) Appl. No.: 10/778,192

(22) Filed: Feb. 17, 2004

(65) Prior Publication Data

US 2004/0159839 A1    Aug. 19, 2004

Related U.S. Application Data

(63) Continuation of application No. 09/858,470, filed on May 17, 2001, now Pat. No. 6,750,924.

(30) Foreign Application Priority Data

May 19, 2000   (JP)   ............... 2000-147263
Mar. 22, 2001  (JP)   ............... 2001-083334

(51) Int. Cl.
    *G02F 1/1343* (2006.01)
(52) U.S. Cl. ............... 349/149; 349/38; 349/43
(58) Field of Classification Search ........ 349/149–152, 349/38, 39, 147, 143, 43; 345/206, 98
    See application file for complete search history.

(56) References Cited

U.S. PATENT DOCUMENTS

| | | | |
|---|---|---|---|
| 5,341,012 A | 8/1994 | Misawa et al. | |
| 5,424,857 A | 6/1995 | Aoki et al. | |
| 5,771,083 A | 6/1998 | Fujihara et al. | |
| 5,789,763 A | 8/1998 | Kato et al. | |
| 5,838,399 A | 11/1998 | Someya et al. | |
| 5,978,056 A | 11/1999 | Shintani et al. | |
| 6,034,749 A | 3/2000 | Sato et al. | |
| 6,081,305 A | 6/2000 | Sato et al. | |
| 6,104,370 A | 8/2000 | Nakagaki et al. | |
| 6,115,097 A | 9/2000 | Yamazaki | |
| 6,133,967 A | 10/2000 | Moon | |
| 6,141,066 A | 10/2000 | Matsushima et al. | |
| 6,177,916 B1 | 1/2001 | Aoki et al. | |
| 6,246,070 B1 | 6/2001 | Yamazaki et al. | |
| 6,266,110 B1 | 7/2001 | Mizuno et al. | |
| 6,303,963 B1 | 10/2001 | Ohtani et al. | |
| 6,400,426 B1 | 6/2002 | Yamazaki et al. | |
| 6,531,966 B1 * | 3/2003 | Krieger | ............... 340/932.2 |

FOREIGN PATENT DOCUMENTS

JP    04-291240    10/1992

(Continued)

*Primary Examiner*—Dung T. Nguyen
*Assistant Examiner*—Thoi V. Duong
(74) *Attorney, Agent, or Firm*—Oliff & Berridge, PLC

(57) ABSTRACT

An electro-optical device having six image signal lines that are third layer leads comprising the same layer as data lines. A lead which is branched from one image signal line and crosses the other image signal lines is a parallel connection of a first layer lead and a second layer lead. The first layer lead comprises the same layer as the scanning lines in a display region and the second layer lead comprises the same layer as a barrier film of a thin film transistor (TFT) in the display region. Although the first and second layer leads have high resistance alone, the parallel connection can reduce resistance. In other portions, the second layer lead is used alone to improve the design versatility. Thus, the design versatility of peripheral circuits such as a sampling circuit in an electro-optical device is improved and the lead resistance in the peripheral circuit is reduced.

10 Claims, 16 Drawing Sheets

FOREIGN PATENT DOCUMENTS

| | | |
|---|---|---|
| JP | 5-150264 | 6/1993 |
| JP | 06-034996 | 2/1994 |
| JP | A 7-294870 | 11/1995 |
| JP | 08-262486 A | 10/1996 |
| JP | 08-328000 A | 12/1996 |
| JP | 09-080477 A | 3/1997 |
| JP | 10-161157 | 6/1998 |
| JP | 10-268350 A | 10/1998 |
| JP | A 10-288797 | 10/1998 |
| JP | 11-084427 A | 3/1999 |
| JP | 11-194360 A | 7/1999 |
| JP | 2000-010121 | 1/2000 |
| JP | 2000-056319 A | 2/2000 |
| JP | 2000-112437 A | 4/2000 |

* cited by examiner

FIG. 1
(a)
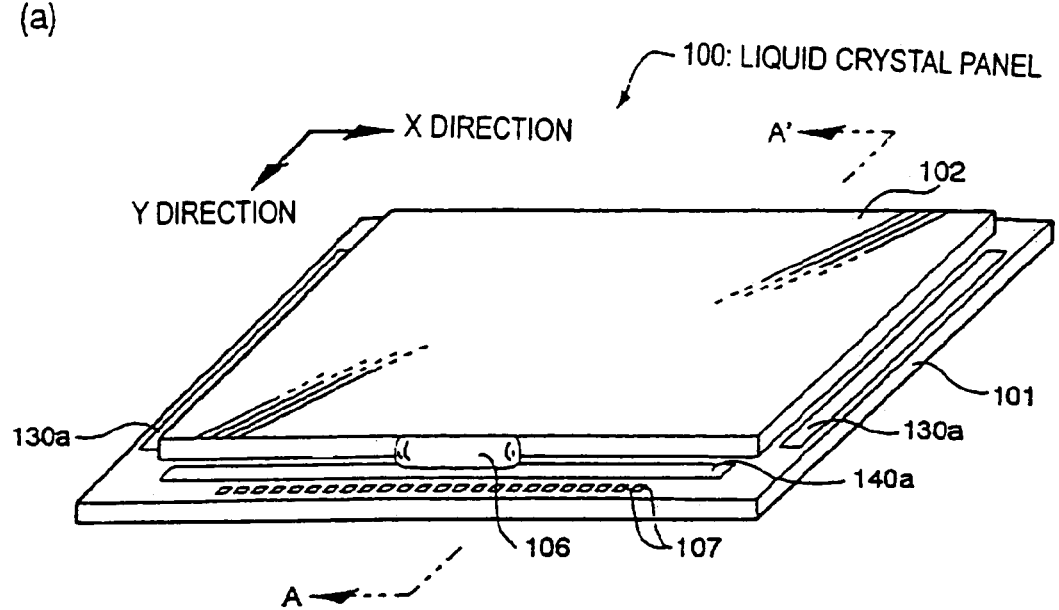
(b)
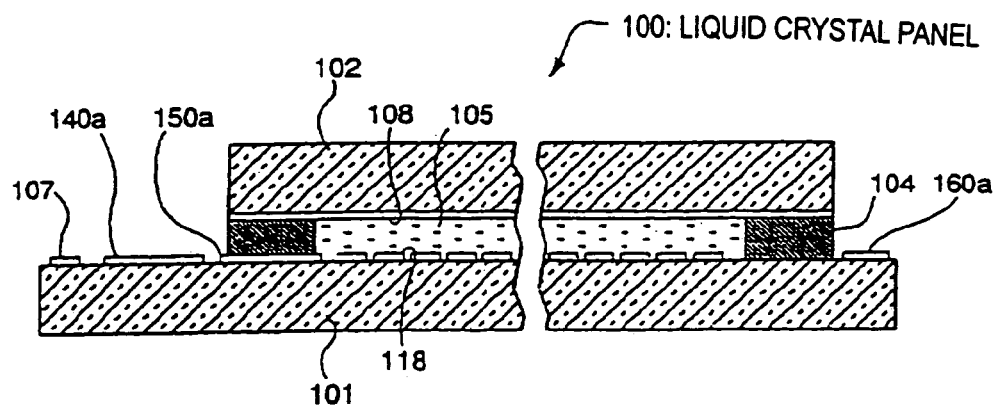

FIG. 7
(a) LINE B-B' CROSS-SECTIONAL VIEW
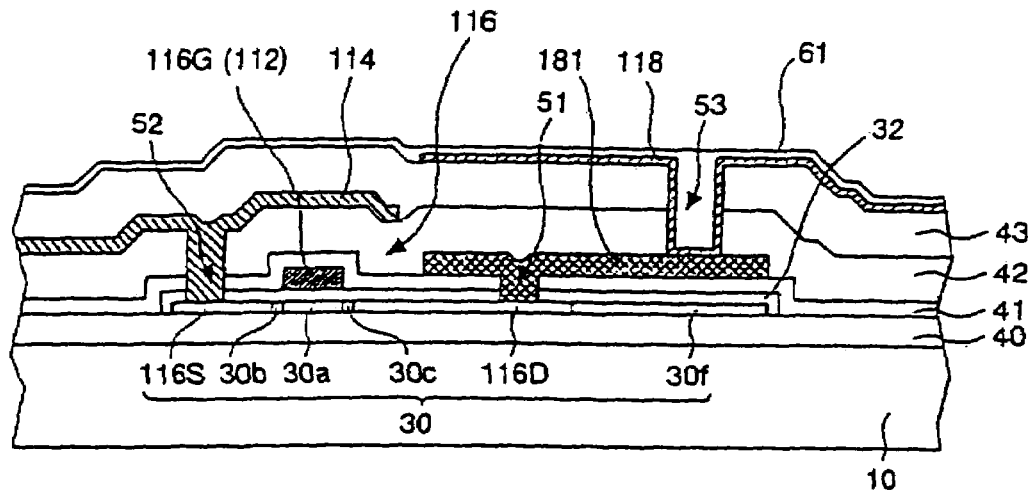
(b) LINE C-C' CROSS-SECTIONAL VIEW
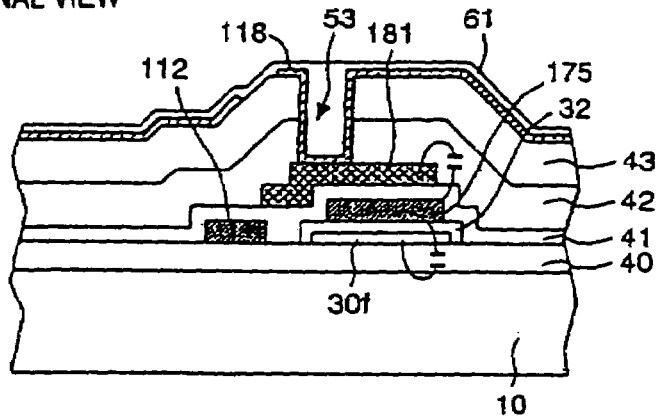
(c) EQUIVALENT CIRCUIT OF STORAGE CAPACITOR
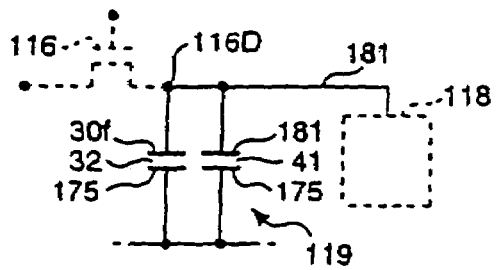

FIG. 8
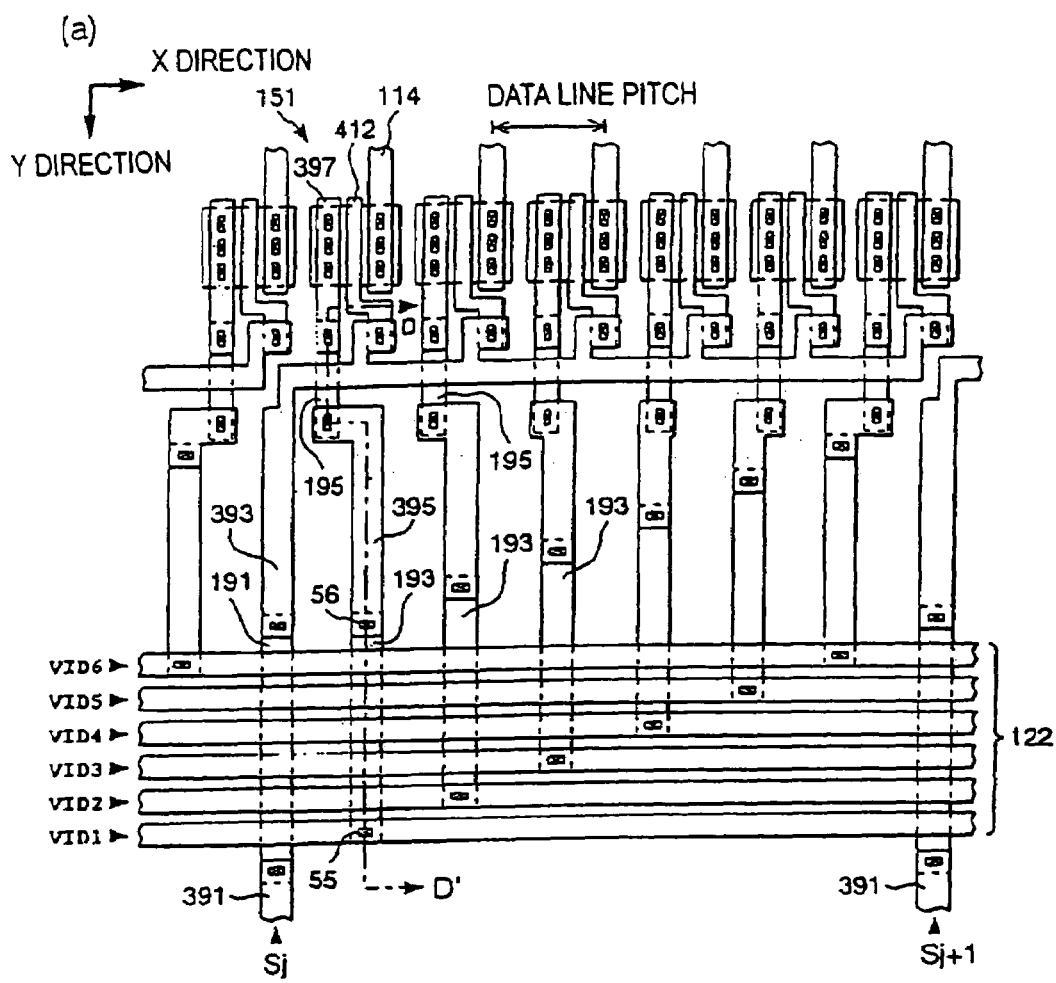
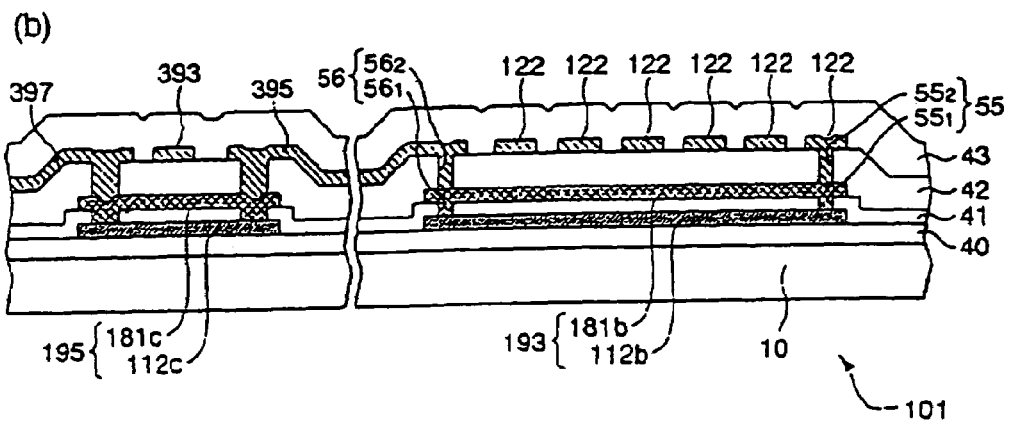

FIG. 9
(a)
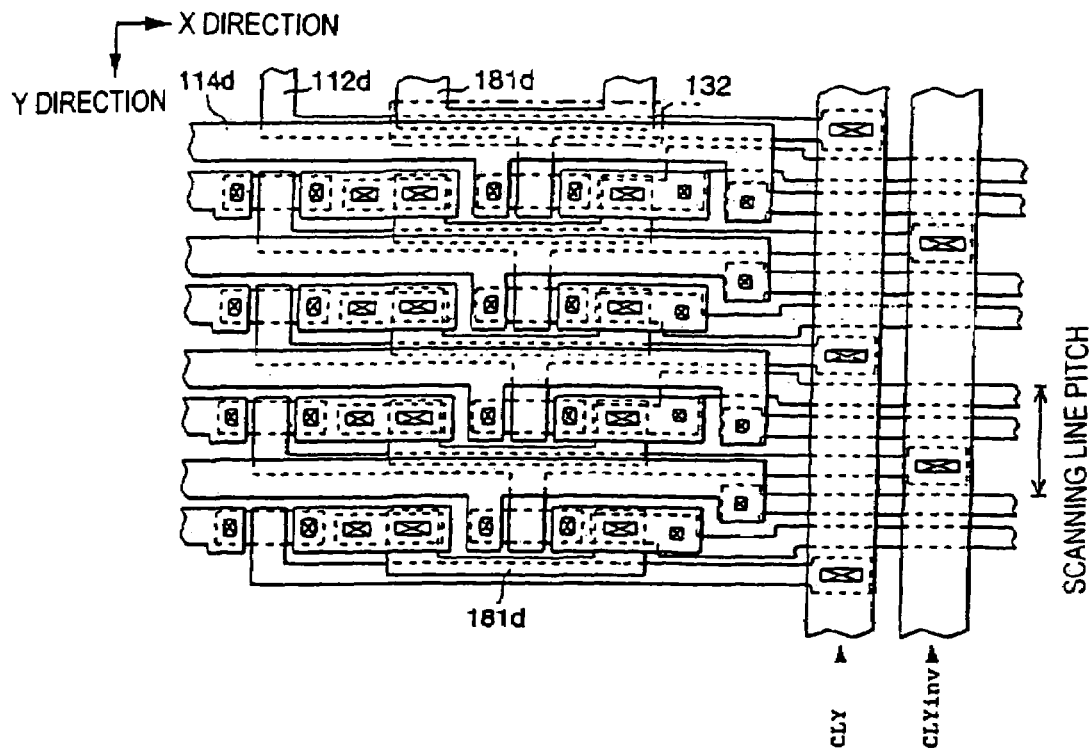
(b)
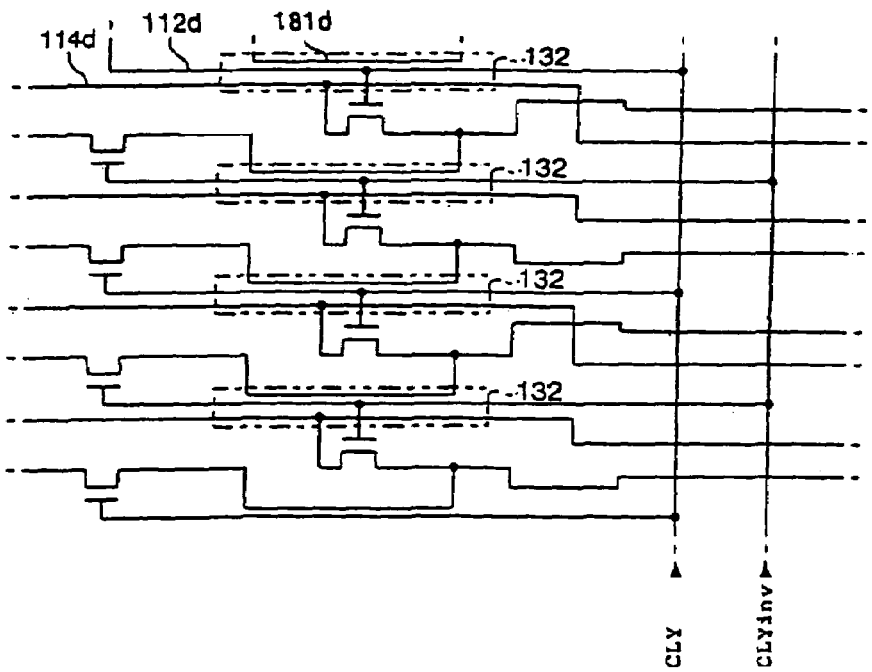

FIG. 10
(1)
PERIPHERAL CIRCUIT REGION          DISPLAY REGION
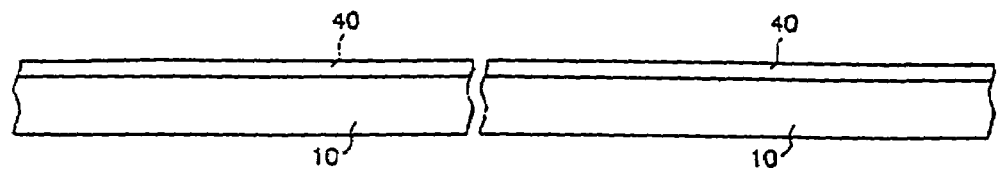
(2)
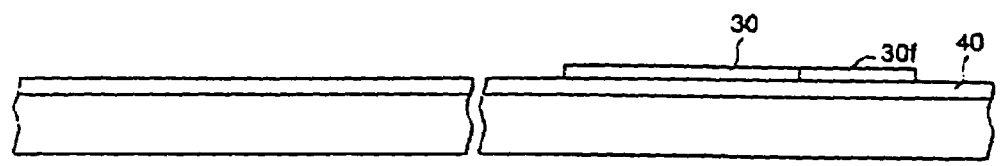
(3)
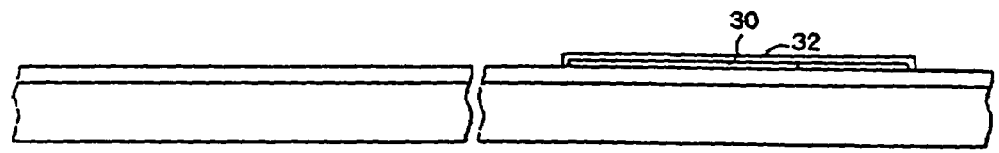

FIG. 12
(7)
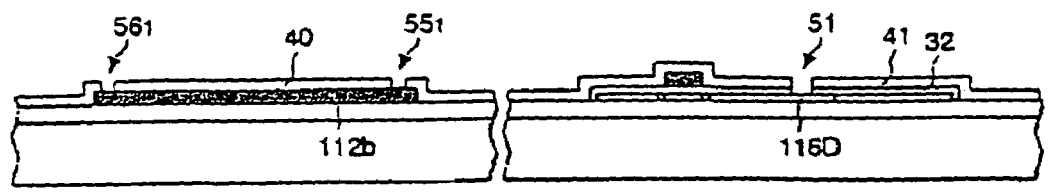
(8)
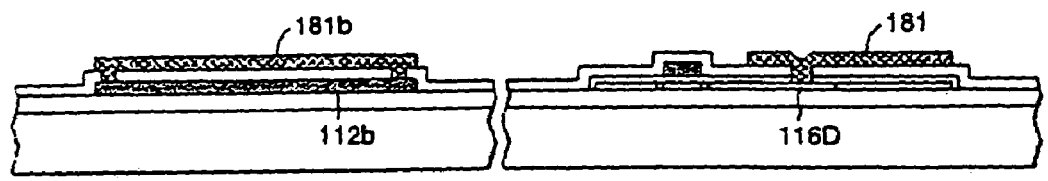
(9)
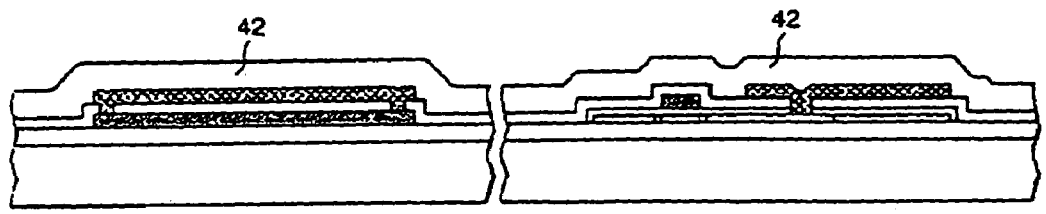

FIG. 13
(10)
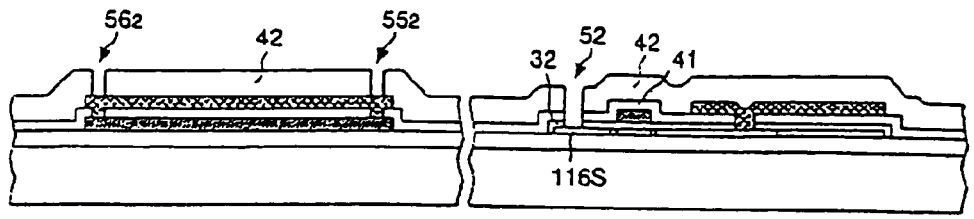
(11)
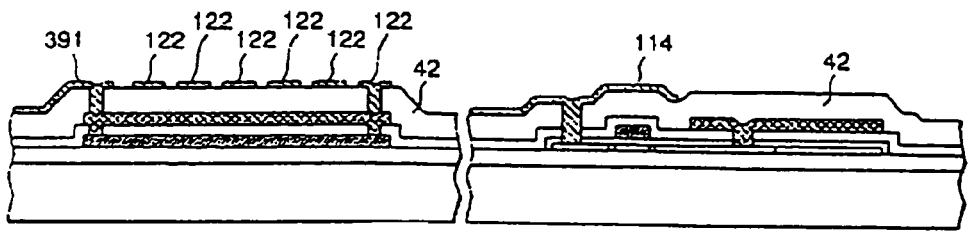
(12)
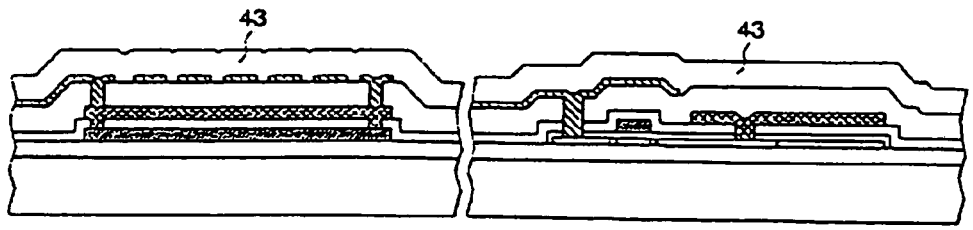
FIG. 14
(13)
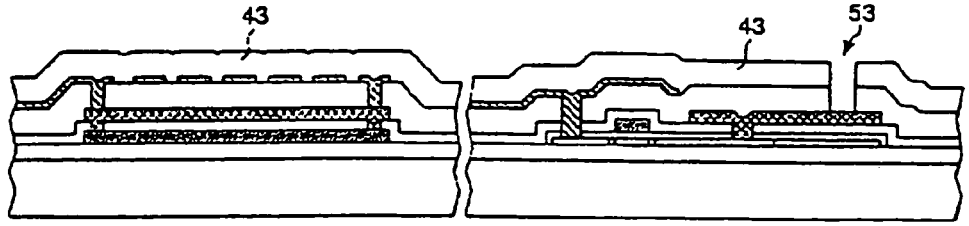
(14)
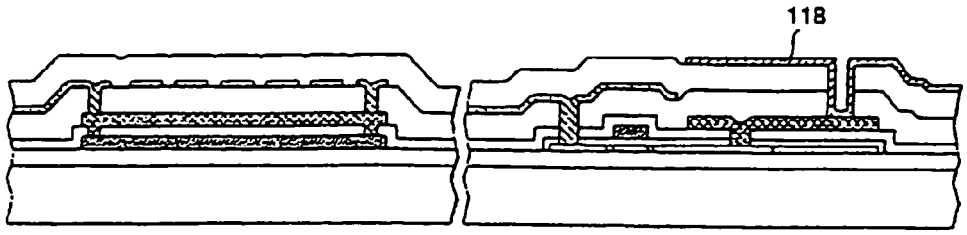

FIG. 15
(a)
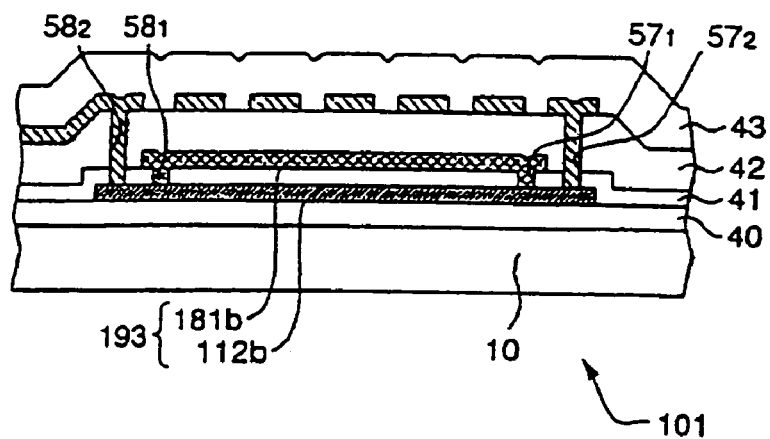
(b)
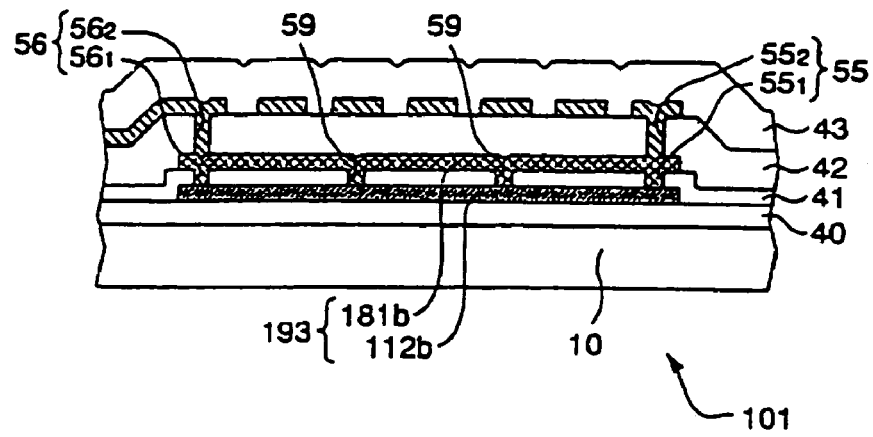

ELECTRO-OPTICAL DEVICE COMPRISING A PRECHARGE CIRCUIT

This is a Continuation of application Ser. No. 09/858,470 filed May 17, 2001 now U.S. Pat. No. 6,750,924. The entire disclosure of the prior application is hereby incorporated by reference herein in its entirety.

BACKGROUND OF THE INVENTION

1. Field of Invention

The present invention relates to an electro-optical device in which a conductive layer different from other conductive layers constituting scanning lines and data lines is used in a peripheral circuit to improve design versatility in the peripheral circuit, a method for making the same, and an electronic apparatus using the electro-optical device as a display section.

2. Description of Related Art

In electro-optical devices, such as in liquid crystal devices that display using liquid crystal as an electro-optical material, the liquid crystal is disposed between a pair of substrates. Among these, for example, an active-matrix liquid crystal device for driving pixel electrodes by three-terminal switching elements has the following configuration. That is, in this liquid crystal device, a plurality of scanning lines and a plurality of data lines are provided so as to cross each other on one substrate, and each of these crossings is provided with a combination of a three-terminal switching element, such as a thin film transistor (hereinafter referred to as TFT), and a pixel electrode. In this device, the TFT turns on to supply an image signal, applied to the corresponding data line, to the pixel electrode when the scanning signal supplied to the scanning line corresponding to the crossing is an active level. The other substrate is provided with transparent counter electrode which opposes the pixel electrodes.

Driving circuits which drive these scanning lines and data lines generally include at least a scanning line driving circuit, a data line driving circuit, and a sampling circuit. Among these, the scanning line driving circuit supplies scanning signals at a predetermined time interval, whereas the data line driving circuit supplies sampling signals at a predetermined time interval. The sampling circuit supplies image signals supplied by a sampling switch, which is provided to each data line via an image signal line, to the corresponding data line in response to the sampling signals.

Moreover, a peripheral-circuit-built-in-type electro-optical device provided with these driving circuits in the peripheries of a region (display region) of a pixel electrode array is developed. In such an electro-optical device, active elements constituting the driving circuits and switching elements connected to the pixel electrodes are formed by a common process, in consideration of efficiency of the production process. For example, in the above liquid crystal device, elements constituting the driving circuits are TFTs which are formed by the same process as the switching elements connected to the pixel electrodes. Such peripheral-circuit-built-in-type electro-optical devices are advantageous for miniaturization and reduction in overall cost of the device, compared with electro-optical devices provided with external driving circuits.

Recently, higher definition arrays, for example, an extended graphics array (XGA: 1024×768 dots), a super extended graphics array (SXGA: 1365×1024 dots), and an ultra extended graphics array (UXGA: 1600×1200 dots), have been required for all displays including electro-optical devices

SUMMARY OF THE INVENTION

To achieve a higher definition array along with miniaturization of the device requires a technology to significantly reduce the array pitch of the semiconductor devices and the array pitch of the data lines. Since the scanning line driving circuit supplies scanning signals to each scanning line, a unit circuit (latch circuit) constituting a portion of the scanning line driving circuit must be contained within the array pitch between the scanning lines. Since the data line driving circuit sequentially supplies sampling signals to sampling switches provided to data lines, a unit circuit constituting a portion of the data line driving circuit must be contained within the array pitch or an integral multiple thereof. However, to achieve a higher definition array and miniaturization of the peripheral-circuit-built-in-type electro-optical device it is difficult to design the device so as to form the unit circuits in the scanning line driving circuit and the data line driving circuit within extremely limited spaces.

The present invention is completed in view of the above circumstances and has an object to provide an electro-optical device that enables improved design versatility in peripheral circuits. In order to achieve the above object, an electro-optical device according to a first aspect of the present invention comprises a plurality of scanning lines and a plurality of data lines, a combination of a switching element and a pixel electrode provided that correspond to each crossing between the scanning lines and the data lines, a conductive interlayer for electrically connecting the corresponding switching element and the corresponding pixel electrode, and a peripheral circuit containing leads which comprise the same layer as the conductive layer constituting the conductive interlayer and driving the switching element.

According to this configuration, the conductive interlayer is used for connecting each switching element and each pixel electrode in the region, of the array of the pixel electrodes (the display region), and leads composed of the same conductive layer as the conductive interlayer are also used in the peripheral circuit. In other words, the conductive interlayer used in the display region is also used as parts of the leads in the peripheral circuit. Since a novel lead layer is provided in the peripheral circuit, design versatility is improved.

In this embodiment, the conductive interlayer is preferably connected to an electrode of the switching element via a first contact hole provided corresponding to the electrode, whereas the pixel electrode is connected to the switching element via a second contact hole. In this configuration, the electrode of the switching electrode is connected to the conductive interlayer via the first contact hole, whereas the pixel electrode is connected to the conductive interlayer via the second contact hole. Since the conductive interlayer functions as a barrier film when the pixel electrode is connected to the other end of the switching element, defects occurring when the contact holes have long distances can be reduced.

In this embodiment, each pixel electrode is preferably provided with a storage capacitor of which one end is connected to the pixel electrode and the other end is commonly connected, and the conductive interlayer functions as a part of an electrode constituting the storage capacitor. According to this configuration, the retention of the voltage in the pixel electrode is improved by the storage capacitor in which the conductive interlayer functions as a part of an electrode constituting the storage capacitor.

In this embodiment, the conductive interlayer may have a light-shading effect, part of the light which pass through or is reflected by the pixel electrodes being regulated by the conductive interlayers. According to this configuration, an exclusive shading film can be omitted at least in the region defined by the conductive interlayer among the light transmission or reflection regions. Thus, the configuration can be simplified.

For achieving the above object, an electro-optical device in accordance with a second aspect of the present invention comprises first, second, and third conductive layers, formed in that order, the third conductive layer having resistance which is lower than that of the first conductive layer, a plurality of scanning lines comprising the first conductive layer, a plurality of data lines comprising the third conductive layer and formed so as to cross the plurality of scanning lines, a combination of a switching element and a pixel electrode provided corresponding to each crossing between the scanning lines and the data lines, a conductive interlayer for electrically connecting the switching element and the corresponding pixel electrode, and a peripheral circuit which is provided with leads comprising the first, second, and third conductive layers and drives each switching element.

According to this configuration, the conductive interlayer is used for connecting the switching element to the pixel electrode, and leads composed of the second conductive layer which is the same as the conductive interlayer are used together with the leads composed of the first conductive layer and the leads composed of the second conductive layer in the peripheral circuit. In other words, the conductive interlayer used in the display region is also used as parts of the leads in the peripheral circuit. Since a novel lead layer is provided in the peripheral circuit, design versatility is improved.

In this embodiment, the conductive interlayer is preferably connected to an electrode of the switching element via a first contact hole provided corresponding to the electrode, whereas the pixel electrode is connected to the switching element via a second contact hole. In this configuration, the electrode of the switching electrode is connected to the conductive interlayer via the first contact hole, whereas the pixel electrode is connected to the conductive interlayer via the second contact hole. Since the conductive interlayer functions as a barrier film when the pixel electrode is connected to the other end of the switching element, defects occurring when the contact holes have long distances can be reduced.

Since the third conductive layer has lower resistance than that of the first conductive layer, it is preferable that all the leads be formed of the third conductive layer. Since crossings and branches of leads are inevitably present in the peripheral circuit, it is impossible that all the leads are formed of the third conductive layer. Thus, in this aspect, the peripheral circuit has a configuration including a parallel lead in which a lead comprising the first conductive layer and a lead comprising the second conductive layer are electrically connected, when, for example, leads are composed of the first conductive layer having high resistance. By using the parallel lead in which the lead composed of the first conductive layer and the lead composed of the second conductive layer are electrically connected, the wiring resistance thereof can be reduced compared to the use of the first or second conductive layer alone.

Such a parallel lead may be used at a portion in which a branched lead is branched from a line comprising the third conductive layer and is used in intersections with other leads different from the lead comprising the third conductive layer. Although such a branched lead should be composed of the third conductive layer having low resistance, a portion composed of the third conductive layer and crossing the other lead cannot be formed of the same third conductive layer.

When the peripheral circuit includes h image signal lines for supplying image signals in response to h data lines wherein h is an integer of at least 2, and sampling switches, each provided to the corresponding data line, samples the corresponding image signal among the image signals supplied to the h image signal lines in response to a predetermined sampling signal, and supplies the image signal to the corresponding data line, the parallel leads are used as at least parts of lines which are branched from the image signal lines towards the sampling switches. Since such leads supply image signals to the pixel electrodes, these leads must be composed of the third conductive layer having low resistance. However, these leads cannot be formed of the same third conductive layer because the leads cross the other image signal lines.

When the parallel lead is formed in this aspect, the lead comprising the second conductive layer of the parallel lead may pass through between third and fourth contact holes which expose the lead comprising the first conductive layer, and the lead comprising the third conductive layer of the parallel lead is provided a position corresponding to the third or fourth contact hole and is electrically connected to a fifth contact hole which exposes the lead comprising the second conductive layer (first configuration). Alternatively, the lead comprising the second conductive layer of the parallel lead may pass through between third and fourth contact holes which expose the lead comprising the first conductive layer, and the lead comprising the third conductive layer of the parallel lead is provided a, position different from the third and fourth contact holes and is electrically connected to a sixth contact hole which exposes the lead comprising the first conductive layer (second configuration). When a stress due to warp is applied to the second conductive layer, cracks may be formed during providing a contact hole which exposes the lead comprising the second conductive layer. Since no contact hole exposing the second conductive layer is provided in the second configuration, defects due to the formation of the cracks can be reduced.

In the first and second configurations, the lead comprising the second conductive layer of the parallel lead is preferably provided between the third and fourth contact holes and is connected to the lead comprising the first conductive layer in one contact hole or a plurality of contact holes. The parallel lead is also connected in parallel in the contact hole(s) other than the third and fourth contact holes.

In this aspect, the peripheral circuit may comprise leads comprising the first, second, and third conductive layers in a partial portion thereof. According to this configuration, three different layer leads are arranged in the same region, reducing the space.

In this embodiment, each pixel electrode is preferably provided with a storage capacitor of which one end is connected to the pixel electrode and the other end is commonly connected, and the conductive interlayer functions as a part of an electrode constituting the storage capacitor. According to this configuration, the retention of the voltage in the pixel electrode is improved by the storage capacitor in which the conductive interlayer functions as a part of an electrode constituting the storage capacitor.

Preferably, the storage capacitor includes a first capacitor comprising the electrode of the switching element, the capacitor line composed of the second conductive layer, and a gate oxide film of the switching element provided therebetween, and a second capacitor comprising the conductive interlayer, the capacitor line, and an insulating interlayer provided therebetween. Since the storage capacitor includes the first capacitor and the second capacitor, capacitance is increased compared to a single capacitor configuration.

In this embodiment, the first conductive layer preferably comprises polysilicon. When the scanning lines are formed of a metallic thin film or metal silicide, defects such as separation will occur in a subsequent high-temperature process.

In this embodiment, the third conductive layer preferably comprises aluminum. By this configuration, resistance of the third conductive layer can be easy to be reduced.

Furthermore, in this embodiment, the second conductive layer preferably comprises a material having a melting point which is higher than that of a material constituting the third conductive layer, since melting or separation in the high-temperature process after the formation of the second conductive layer must be prevented. Examples of the materials having high melting points include polysilicon, titanium (Ti), chromium (Cr), tungsten (W), tantalum (Ta), molybdenum (Mo), lead (Pb), and alloys and metal silicides thereof.

An electro-optical device in accordance with a third aspect of the present invention comprises a plurality of scanning lines and a plurality of data lines, a combination of a switching element and a pixel electrode provided corresponding to each crossing between the scanning lines and the data lines, a conductive interlayer for electrically connecting the switching element and the corresponding pixel electrode, a peripheral circuit for driving the switching element, and leads connected to the peripheral circuit and comprising the same layer as a conductive layer which constitutes the conductive interlayer.

In this aspect, the leads connected to the peripheral circuit can be formed of the same conductive layer as the conductive interlayer used for connecting the switching element and the pixel element. Since this conductive layer can as a novel lead layer, design versatility is improved.

In this embodiment, the leads cross beneath at least one image signal line which comprises the same layer as a conductive layer which constitutes the data lines. In this configuration, the leads crossing the image signal lines can be formed of the same conductive layer as the conductive interlayer.

A plurality of image signal lines are provided, each image signal line is connected to the corresponding lead, and these leads have substantially the same size. In this configuration, the leads connected to these image signal lines have substantially the same resistance, differences between image signals due to the difference in resistance between the leads can be prevented, ensuring satisfactory display.

In this embodiment, the electro-optical device can further include a first conductive layer which comprises the same layer as the conductive layer constituting the data lines, a second conductive layer which comprises the same layer as the conductive layer constituting the data lines and is formed at a position distant from the first conductive layer, and a third conductive layer which comprises the same layer as the second conductive layer of the switching element, the third conductive layer being electrically connected with the first conductive layer and the second conductive layer via a contact holes. According to this configuration, the third conductive layer comprising the same layer as the semiconductor layer of the switching element is formed as a bypass.

In this embodiment, each lead is electrically connected to the third conductive layer via at least one contact hole. Since the lead and the third conductive layer are connected to each other in parallel in this configuration, the lead has low resistance.

This embodiment can be characterized in that the third conductive layer comprises polysilicon. According to this configuration, the lead is electrically connected to the third conductive layer of polysilicon via the contact hole. Thus, the lead does not have cracks when the lead is formed of a high-melting-point metal. Since the third conductive layer is formed of polysilicon, cracks are not formed in the polysilicon, although the third conductive layer is electrically connected to the first conductive layer and the second conductive layer via the contact hole.

This embodiment can further be characterized in that each lead is electrically connected to the third conductive layer via at least three contact holes. According to this configuration, a redundant lead is formed between the lead and the third conductive layer, preventing short-circuiting between the lead and the third conductive layer due to cracks in the lead and the third conductive layer.

This embodiment can be characterized in that an image signal line which comprises the same layer as the conductive layer constituting the data lines is arranged between the first conductive layer and the second conductive layer. According to this configuration, the image signal line comprising the same layer as the conductive layer constituting the data lines is arranged without interference the first and second conductive layers.

Since an electronic apparatus of the present invention is provided with the above electro-optical device, the design versatility of the peripheral circuit can be improved.

In accordance with the present invention, a method for making an electro-optical device having a plurality of scanning lines, a plurality of data lines, and a combination of a switching element and a pixel electrode provided at a position corresponding to each crossing between the scanning lines and the data lines, includes the steps of forming the switching element at the position corresponding to each crossing between the scanning lines and the data lines, forming a conductive interlayer connected to the switching element and a lead used in a peripheral circuit for driving the switching element using the same conductive layer, and forming the pixel electrode connected to the conductive interlayer. According to this method, a novel lead layer is provided in the peripheral circuit as in the first aspect, and thus the design versatility is increased.

In accordance with the present invention, a method for making an electro-optical device having a:plurality of scanning lines, a plurality of data lines, and a combination of a switching element and a pixel electrode provided at a position corresponding to each crossing between the scanning lines and the data lines, includes the steps of: after forming the scanning lines and leads used in a peripheral circuit for driving the corresponding switching element by using the first conductive layer, and forming the switching element at the positions corresponding to each crossing between the scanning lines and the data lines, forming a conductive interlayer connected to each switching element and leads used in a peripheral circuit for driving the corresponding switching element by using a second conductive layer, forming leads used in the data lines and the peripheral circuit by using a third conductive layer and forming the pixel electrode connected to the conductive interlayer. According to this method, a novel lead layer is provided in the peripheral circuit as in the second aspect, improving the design versatility.

BRIEF DESCRIPTION OF THE DRAWINGS

This invention is described in detail with regard to the following figures, wherein like numerals reference like elements, and wherein:

FIG. 1(a) is an isometric view illustrating a liquid crystal panel of an exemplary electro-optical device in accordance with the present invention;

FIG. 1(b) is a cross-sectional view taken from line A–A' in FIG. 1(a);

FIG. 7(a) is a cross-sectional view taken from line B–B' in FIG. 6;

FIG. 7(b) is a cross-sectional view taken from line C–C' in FIG. 6;

FIG. 7(c) is an equivalent circuit diagram illustrating a storage capacitor configuration in the liquid crystal panel;

FIG. 8(a) is a plan view illustrating a configuration in the vicinity of a sampling circuit of the liquid crystal panel;

FIG. 8(b) is a cross-sectional view taken from line D–D' in FIG. 8(a);

FIG. 9(a) is a plan view illustrating a partial configuration of a scanning line driving circuit of the liquid crystal panel;

FIG. 9(b) is a block diagram illustrating an electrical configuration thereof;

FIGS. 10(1) to 10(3) are cross-sectional views illustrating production steps of a device substrate of the liquid crystal panel;

FIGS. 12(7) to 12(9) are cross-sectional views illustrating production steps of the device substrate of the liquid crystal panel;

FIGS. 13(10) to 13(12) are cross-sectional views illustrating production steps of the device substrate of the liquid crystal panel;

FIGS. 14(13) and 14(14) are cross-sectional views illustrating production steps of the device substrate of the liquid crystal panel;

FIGS. 15(a) and 15(b) are cross-sectional views illustrating configurations in the vicinity of sampling circuits of electro-optical devices according to modifications of the present invention;

DETAILED DESCRIPTION OF PREFERRED EMBODIMENTS

Figure 2:
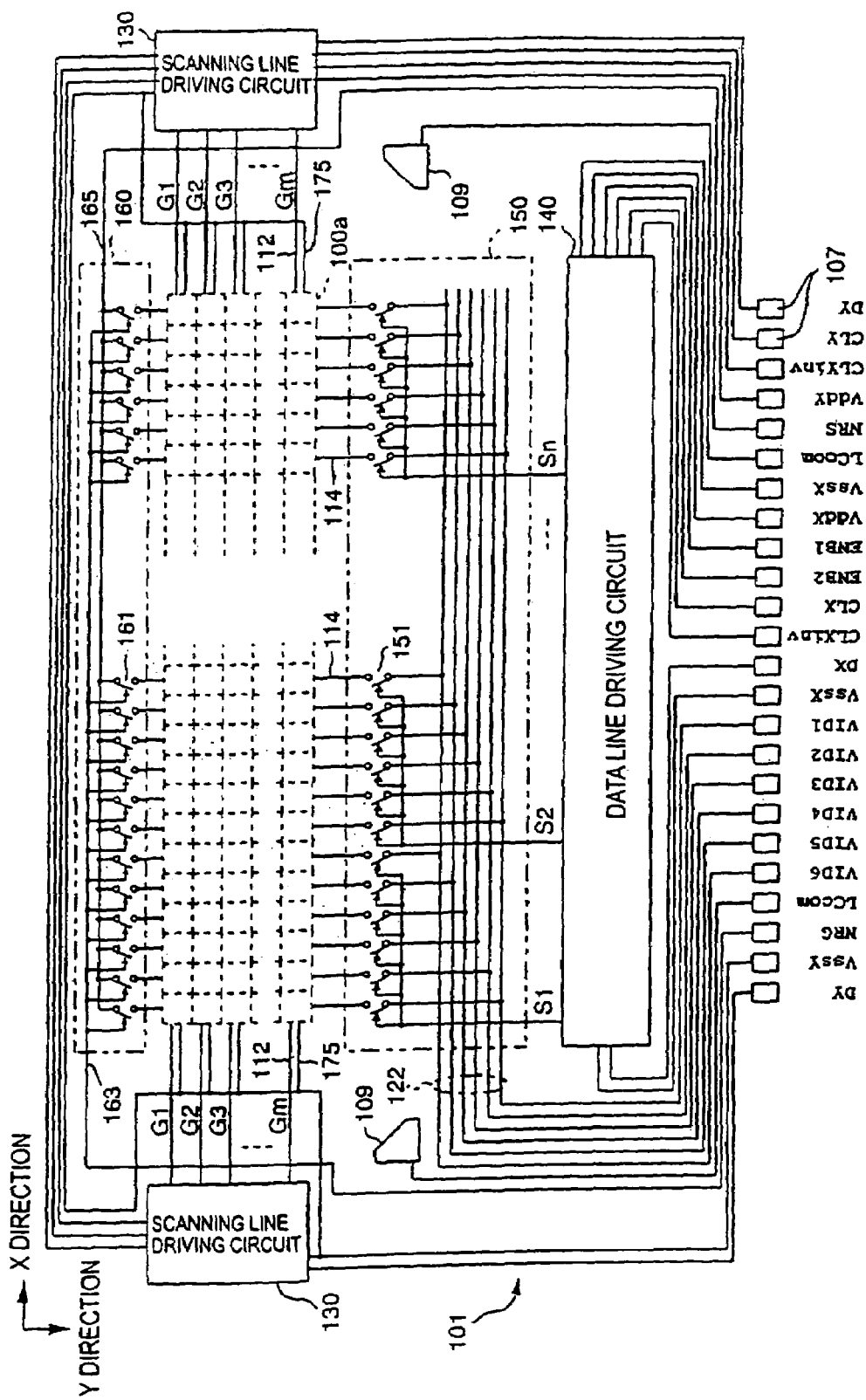
FIG. 2 is a block diagram illustrating an electrical configuration of the liquid crystal panel.

FIG. 1(a) is an isometric view illustrating a liquid crystal panel 100 of an electro-optical device other than external circuits of the electro-optical device, and FIG. 1(b) is a cross-sectional view taken from line A–A' in FIG. 1(a). This electro-optical device displays a given image according to an electro-optical change of a liquid crystal which is an electro-optical material.

As shown in the drawings, the liquid crystal panel 100 includes a device substrate 101 provided with various elements and pixel electrodes 118 and an opposite substrate 102 provided with a counter electrode 108. These substrates are bonded to each other with a sealant 104 containing spacers (not shown in the drawing) at a predetermined gap so that the faces provided with the corresponding electrodes oppose each other. The gap is filled with, for example, a twisted nematic (TN) liquid crystal 105.

The device substrate 101 can be formed of glass, semiconductor, or quartz, whereas the opposite substrate 102 can be formed of glass. When the device substrate 101 is opaque, the substrate can be used as a reflective type, not as a transmissive type. The sealant 104 is provided along the peripheries of the opposite substrate 102 and has an opening for enclosing the liquid crystal 105. Thus, the opening is sealed with a sealant 106 after the liquid crystal 105 is enclosed.

A data line driving circuit for outputting sampling signals is formed in a region 140a at one side of the exterior of the sealant 104 on the inner face of the device substrate 101. Image signal lines and a sampling circuit may be formed in a region 150a in the vicinity of the sealant 104 at this side. A plurality of mounting terminals 107 can be provided in the outer portion of this side in order to input various signals from external circuits (not shown in the drawing).

Scanning line driving circuits are formed in regions 130a at the two sides adjoining this side in order to drive scanning lines from the both sides. Alternatively, only one scanning line driving circuit may be provided on one of these sides, if delay of the scanning signals supplied to the scanning lines is not significant.

A precharge circuit may be formed in a region 160a at the residual side, and lines commonly used in the two scanning line driving circuits may be formed outside this circuit.

As shown in FIG. 1(b), a counter electrode 108 provided on the opposite substrate 102 is electrically connected to the device substrate 101 with conductive members at at least one corner of the bonding portion with the device substrate 101. Further, the opposite substrate 102 is provided with color layers (color filters) in the region opposing the pixel electrodes 118, if necessary, although they are not shown in the drawing. However, as described in greater detail below, when the opposite substrate 102 is used in color light modulation as in a double-plate projector, the opposite substrate 102 does not require color layers.

In a conventional opposite substrate 102, a shading film is provided at the portion other than regions facing the pixel electrodes 118 in order to prevent a decrease in contrast caused by light leakage, whether or not the color layers are provided. In this embodiment, the shading region at the pixel section is defined in the device substrate 101, as described below. Thus, the opposite substrate 102 is not provided with a shading film.

The inner faces of the device substrate 101 and the opposite substrate 102 are provided with alignment films (not shown in FIG. 1) which are subjected to rubbing treatment so that molecules of the liquid crystal 105 are continuously twisted by approximately 90 degrees in the long axis between these substrates. The outer faces of these substrates are provided with polarizers (not shown in the drawing) corresponding to the alignment directions. In FIG.

1(b), the counter electrode 108, the pixel electrodes 118, and the mounting terminals 107 are depicted so as to have considerable thicknesses, in order to show the positions thereof clearly. However, these thicknesses are significantly small compared to the thicknesses of the substrates.

The electrical configuration of the device substrate 101 in the liquid crystal panel 100 will now be described. FIG. 2 is an outline view illustrating the configuration. As shown in the drawing, the device substrate 101 is provided with a plurality of mounting terminals 107 to input various signals from external circuits. The signals input through these mounting terminals 107 are supplied to required sections via various lines. These signals are now briefly described.

Figure 4:
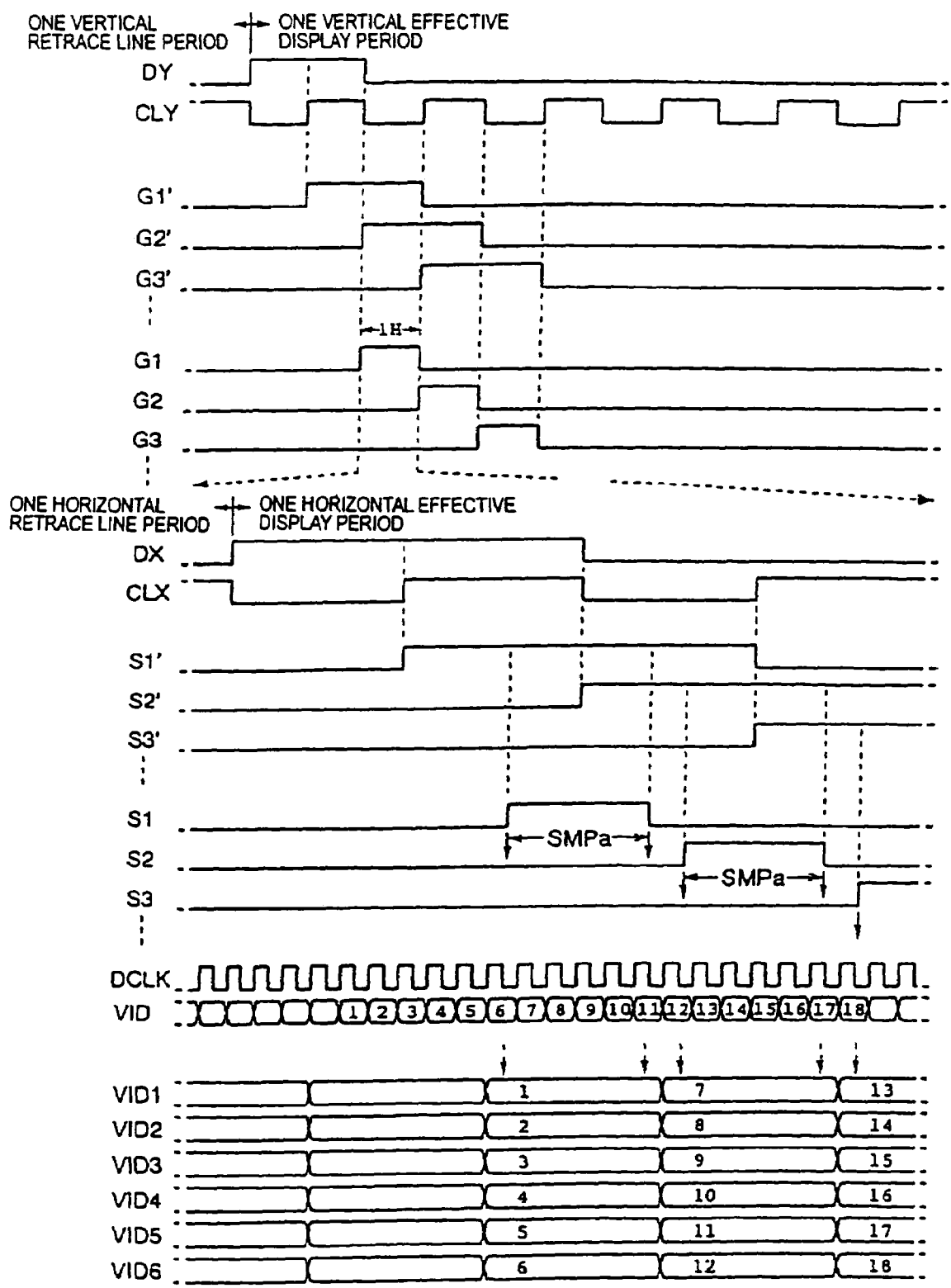
FIG. 4 is a timing chart illustrating the operation of the liquid crystal panel.

First, as shown in FIG. 4, VID1 to VID6 correspond to six-system image signals which are divided from one-system image signal supplied in synchronization with a dot-clock signal DCLK, and are elongated to six times in the time axis. These are supplied to a sampling circuit 150 via six image signal lines 122.

The polarity of image signals VID1 to VID6 is appropriately reversed by an external circuit. The polarity reversion in this embodiment means that a voltage level is mutually reversed between positive polarity and negative polarity with reference to a voltage $LC_{com}$ which is applied to the counter electrode 108. Whether or not the polarity is reversed is determined in consideration that the application mode of image signals to the data lines is (1) polarity reversion per scarning line; (2) polarity reversion per data line; (3) polarity reversion per pixel; or (4) polarity reversion per frame. The reversion period is set to one horizontal scanning period or a dot-clock DCLK or one vertical scanning period. In this embodiment, the case of (1) polarity reversion per scanning line is described as an example, but it is to be understood that the present invention is not limited thereto.

Second, VssY and VssX represent low-level-side voltages (ground voltages) of a power supply at scanning line driving circuits 130 and a data line driving circuit 140, respectively. On the other hand, VddY and VddX represent high-level-side voltage of a power supply at the scanning line driving circuits 130 and the data line driving circuit 140, respectively. Among these, the low-level-side voltage VssY of the power source is a ground potential of storage capacitors (described later) and is supplied to each pixel via capacitor lines 175.

Third, $LC_{com}$ is a voltage signal applied to the counter electrode 108. Thus, two electrodes 109 for supplying the voltage signal $LC_{com}$ are provided at positions corresponding to corners of the sealant 104 (see FIG. 1) used for bonding with the opposite substrate 102. When the device substrate 101 and the opposite substrate 102 are bonded to each other, the electrodes 109 and the counter electrode 108 are connected to each other with conductive members so that the voltage signal $LC_{com}$ is applied to the counter electrode 108. The voltage signal $LC_{com}$ is constant with respect to the time axis, and an external circuit distributes the image signals VID1 to VID6 to the high-level side and the low-level side every horizontal scanning period with reference to this voltage signal $LC_{com}$ to perform AC drive. In this embodiment, the electrodes 109 are provided at two positions. Since the electrodes 109 are provided to apply the voltage signal $LC_{com}$ to the counter electrode 108 via the conductive members, at least one position is required for the electrodes 109. Accordingly, the electrodes 109 may be provided at one position or at three or more positions.

Fourth, as shown in FIG. 4, DY represents a transmission-initiation pulse which is firstly supplied in one vertical effective scanning period, whereas CLY represents a clock signal used in the scanning line driving circuits 130. $CLY_{inv}$ represents a reversed clock signal obtained by level reversion of the clock signal CLY.

Fifth, as shown in FIG. 4, DX represents a transmission-initiation pulse which is firstly supplied in one horizontal effective scanning period, whereas CLX represents a clock signal used in the data line driving circuit 140. $CLX_{inv}$ represents a reversed clock signal obtained by level reversion of the clock signal CLX. ENB1 and ENB2 represent enable signals which are used for limiting each output signal of a shift register in the data line driving circuit 140 to a predetermined pulse width. In addition, NRG represents a precharge control signal, and NRS represents a precharge voltage signal. These signals will be described in greater detail below.

In the display region 100a of the device substrate 101, a plurality of scanning lines 112 is arranged in parallel in the line (Y) direction, whereas a plurality of data lines 114 is arranged in parallel in the row (X) direction. Pixels are provided at the crossings thereof.

Figure 3:
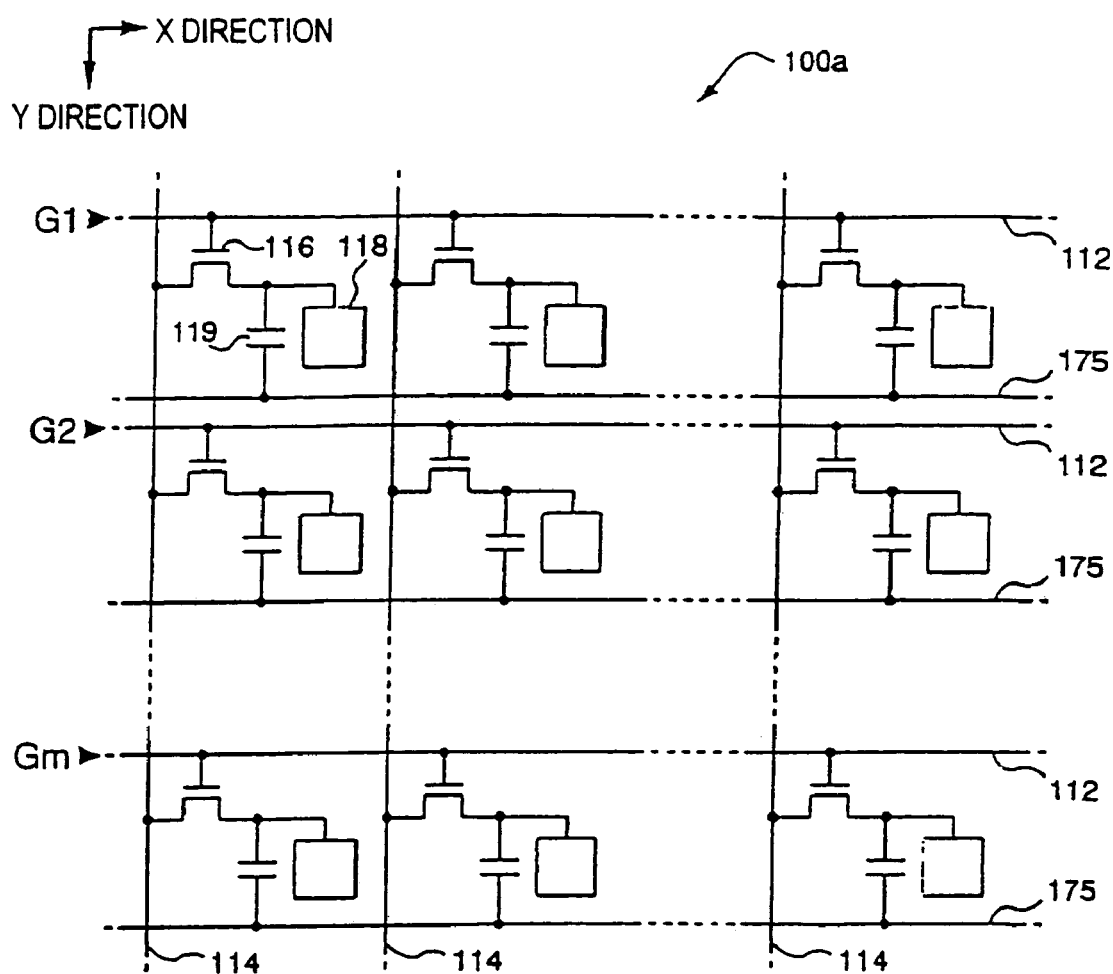
FIG. 3 is an equivalent circuit diagram in a display region of the liquid crystal panel.

Specifically, as shown in FIG. 3, at the crossings of the scanning lines 112 and the data lines 114, gates of TFTs 116 which are switching elements for controlling the pixels are connected to scanning lines 112, sources of the TFTs 116 are connected to the data lines 114, and drains of the TFTs 116 are connected to rectangular transparent pixel electrodes 118.

As described above, in the liquid crystal panel 100, the liquid crystal 105 is enclosed between the inner faces provided with the electrodes of the device substrate 101 and the opposite substrate 102. Thus, the liquid crystal capacitor of each pixel is defined by the respective pixel electrode 118, the respective counter electrode 108, and the liquid crystal 105 enclosed therebetween. Suppose that the total number of the scanning lines 112 is [m] and the total number of the data lines 114 is [6n] (wherein m and n are integers), the pixels are arranged as a matrix of m lines ×6n rows corresponding to the crossings of the scanning lines 112 and the data lines 114.

In addition, each pixel is provided with a storage capacitor 119 to prevent leakage of the liquid crystal capacitor. One end of the storage capacitor 119 is connected to one pixel electrode 118 (the drain of one TFT 116), whereas the other end is connected in common to one capacitor line 175. Since the storage capacitor 119 and the liquid crystal capacitor are arranged electrically in parallel, the retention property of the liquid crystal capacitor is improved, resulting in high-contrast display. In this embodiment, the low-level-side voltage VssY of the power supply is applied to the capacitor line 175. Since it is preferred that a constant voltage be applied thereto over time, the high-level-side voltage VddY or the voltage signal $LC_{com}$ may be applied thereto. The detailed configuration of the pixel including the-storage capacitor 119 will be described in greater detail below.

Referring again to FIG. 2, the scanning line driving circuits 130 output scanning signals G1, G2, . . . , Gm, which reach an active level sequentially every horizontal scanning period 1 H, to the corresponding scanning lines 112 within one vertical effective display period. Although the detailed configuration which is not directly concerned with the present invention is not shown in the drawing, the configuration includes a shift register and a plurality of AND circuits (or NAND circuits). As shown in FIG. 4, the shift register sequentially shifts the transmission-initiation pulse DY, which is supplied at the beginning of this vertical effective scanning period when the level of the clock signal CLY (and the reversed clock signal $CLY_{inv}$) is changed (at both the rising edge and the falling edge), and outputs signals G1', G2', G3', . . . , Gm'. Each AND circuit determines AND signals between adjoining two signals among the signals G1', G2', G3', . . . , Gm' and outputs scanning signals G1, G2, G3, . . . , Gm.

The data line driving circuit 140 outputs sampling signals S1, S2, . . . , Sn, which sequentially reach an active level, within one horizontal effective scanning period. Although a detailed configuration which is not directly concerned with the present invention is not shown in the drawing, the configuration includes a shift register and a plurality of AND circuits. As shown in FIG. 4, the shift register sequentially shifts the transmission-initiation pulse DX, which is supplied at the beginning of this horizontal effective scanning period when the level of the clock signal CLX (and the reversed clock signal $CLX_{inv}$) is changed, and outputs signals S1', S2', S3', . . . , Sn'. Each AND circuit reduces the pulse width of the signals S1', S2', S3', . . . Sn' to the period SMPa using the enable signal ENB1 or ENB2 so as to avoid overlapping of the two adjoining signals, and outputs sampling signal S1, S2, S3, . . . , Sn.

The sampling circuit 150 consists of sampling switches 151, each provided for each data line 114. On the other hand, the data lines 114 are blocked every six lines. Among six data lines 114 which belong to j-th block (wherein j is 1, 2, . . . , n) from the left in FIG. 2, the sampling switch 151 connected to one end of the leftmost data line 114 samples the image signal VID1 supplied via one scanning lines 112 in the period in which the sampling signal Sj is active and supplies the signal to the data line 114. Similarly, among six data lines 114 belonging to the j-th block, the sampling switch 151, each being connected to one end of the second data lines 114, samples the image signal VID2 supplied via image signal lines 122 in the period in which the sampling signal Sj is active and supply these signals to the corresponding data lines 114.

Similarly, among six data lines 114 belonging to the j-th block, the sampling switches 151, each being connected to one end of each of the third, fourth, fifth, and sixth data lines 114, samples image signals VID3, VID4, VID5, and VID6, respectively, supplied via image signal lines 122 in the period in which the sampling signal Sj is active and supply these signals to the corresponding data lines 114. When the sampling signal Sj reaches the active level, the image signals VID1 to VID6 are simultaneously supplied to the corresponding six data lines 114 which belong to the i-th block.

On the other hand, another region adjoining the display region 100a and away from the data line driving circuit 140 is provided with a precharge circuit 160. This precharge circuit 160 includes precharge switches 161, each being provided for each data line 114. Each precharge switch 161 precharges a precharge voltage signal NRS supplied from a precharge signal line 165 to the corresponding data line 114 when a precharge control signal NRG supplied from a precharge control line 163 reaches an active level.

Figure 5:
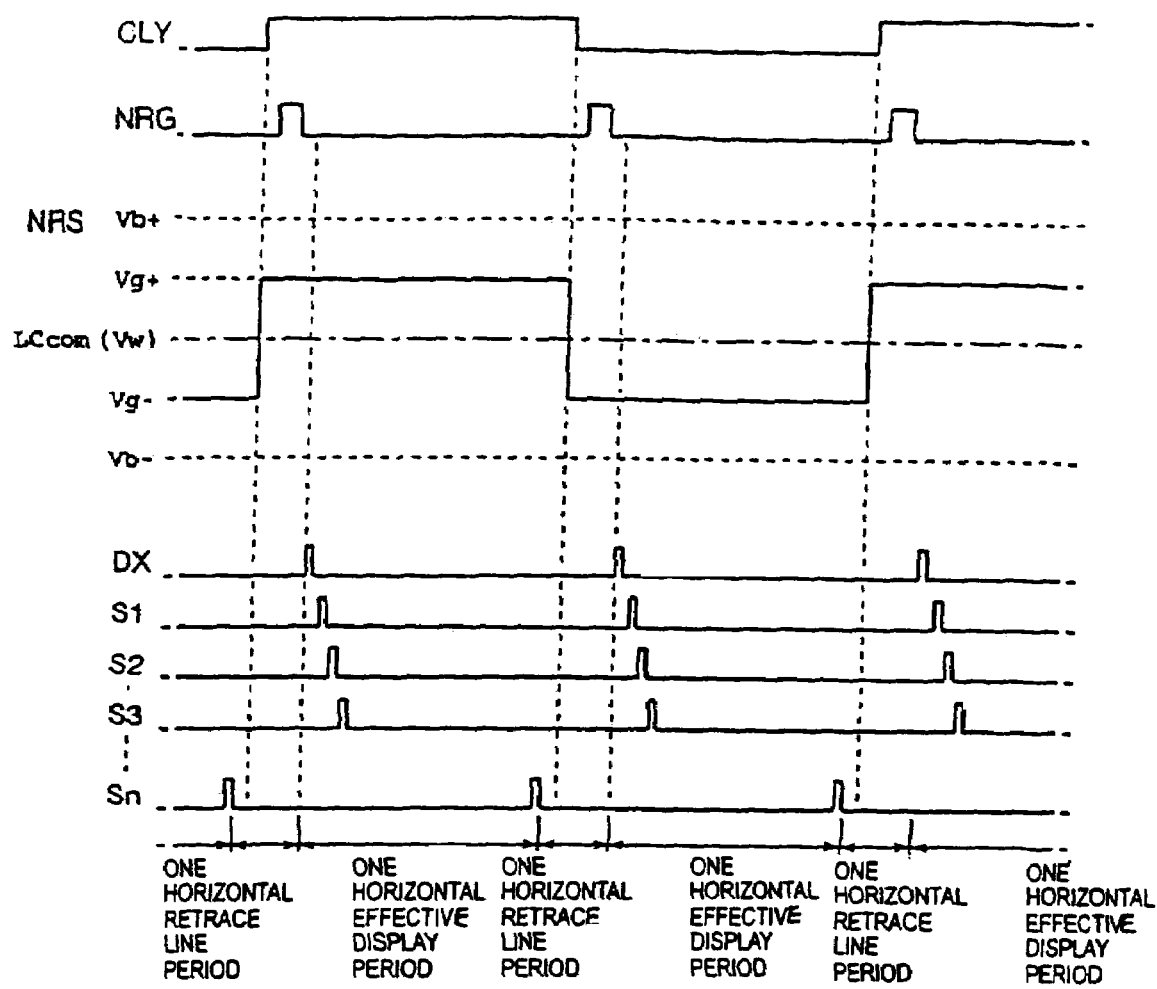
FIG. 5 is a timing chart illustrating the operation of the liquid crystal panel.

As shown in FIG. 5, the precharge control signal NRG is a signal having an active level at an interval which is isolated from the temporal front and rear ends in one horizontal retrace line period. The precharge voltage signal NRS is a signal which is inverted between voltages Vg+ and Vg− with reference to the voltage $LC_{com}$ every horizontal scanning period, as shown in the drawing.

As described above, the voltage $LC_{com}$ is a constant voltage which is applied to the counter electrode 108 and is an amplitude-centered voltage of the image signals VID1 to VID6. The effective values of the differential voltages of the voltage Vg+ and Vg− with respect to the voltage $LC_{com}$ are equal to each other. In other words, the absolute values of differential voltages are the same. Therefore, the voltage Vg+ and Vg− are a higher side voltage and a lower-side voltage, respectively, than the voltage $LC_{com}$. Assuming that the voltages to be applied to the positive electrode side and the negative electrode side of the pixel electrode 118 are Vb+ and Vb−, respectively, for black display when this embodiment is a normally white mode performing white display in a voltage-unapplied-state, the voltage Vg+ is set to an intermediate voltage between the Vb+ and the voltage $LC_{com}$, whereas the voltage Vg− is set to an intermediate voltage between the Vb− and the voltage $LC_{com}$. In other words, the voltages Vg+ and Vg− correspond to the intermediate (gray) voltages in the writing mode at the positive electrode side and the negative electrode side, respectively.

According to the precharge circuit 160 having such a configuration, each data line 114 is precharged to a voltage Vg+ or Vg− in one horizontal retrace line period which is prior to one horizontal effective display period for supplying sampling signals S1, S2, S3, . . . , Sn. Thus, load when the image signals VID1 to VID6 are sampled to the data lines 114 in the subsequent one horizontal effective display period is reduced.

Since the scanning line driving circuits 130, the data line driving circuit 140, the sampling circuit 150, the precharge circuit 160, as well as an inspection circuit for checking the defects after the production, are formed in the peripheries of the display region 100a, these are referred to as peripheral circuits. Since the inspection circuit is not directly concerned with the present invention, the description thereof is omitted.

The operation of the electro-optical device in accordance with the above configuration will now be described. First, one horizontal scanning period 1 H in which the scanning signal G1 is an active level is described. Assuming that writing at the positive electrode side is performed in this one horizontal scanning period 1 H, the image signals VID1 to VID6 are higher voltages than the voltage $LC_{com}$ applied to the counter electrode 108.

Prior to this, as shown in FIG. 5, the precharge control signal NRG reaches the active level at an interval which is isolated from the temporal front and rear ends in one-horizontal retrace line period, wherein the precharge voltage signal NRS has the voltage Vg+ in response to the writing at the positive electrode side. Thus, all the data lines 114 are precharged to the voltage Vg+ within this period.

When one horizontal effective display period reaches after the completion of the horizontal retrace line period, as shown in FIGS. 4 and 5, the transmission-initiation pulse DX is supplied to the data line driving circuit 140. This transmission-initiation pulse DX is output as signals S1', S2', S3', . . . , Sn' which are sequentially shifted when the level of the clock signal CLX changes. The pulse width of each of the signals S1', S2', S3', . . . , Sn' is reduced to the period SMPa so that the adjoining two signals do not overlap and are output as sampling signals S1, S2, S3, . . . , Sn.

On the other hand, as shown in FIG. 4, the one-system image signal VID is divided into the image signals VID1 to VID6 by the external circuit, and the image signals VID1 to VID6 are elongated to six times in the time axis and are supplied to the liquid crystal panel 100.

When the sampling signal S1 becomes the active level in the period in which the scanning signal G1 becomes the active level, all TFTs on the first line from the top in FIG. 2 turn on and the image signals VID1 to VID6 are sampled to six data lines 114 which belong to the first block. The sampled image signals VID1 to VID6 are applied to the corresponding pixel electrodes 118 by the TFTs 116 in the pixels at the crossings of the first scanning lines 112 and the six data lines 114.

When the sampling signal S2 becomes the active level, the image signals VID1 to VID6 are sampled to six data lines 114 which belong to the second block, and the sampled image signals VID1 to VID6 are applied to the corresponding pixel electrodes 118 by the TFTs 116 in the pixels at the crossings of the first scanning lines 112 and this six data lines 114.

Similarly, when the sampling signals S3, S4, . . . , Sn sequentially become the active level, the image signals VID1 to VID6 are sequentially sampled to six data lines 114 which belong to the third, fourth, . . . , n-th blocks. These sampled image signals VID1 to VID6 are applied to the corresponding pixel electrodes 118 by the TFTs 116 in the pixels at the crossings of the first scanning lines 112 and the corresponding six data lines 114. Writing to all pixels in the first line is thereby completed.

Next, the period when the scanning signal G2 is active will be described. In this embodiment, the polarity reversion is performed every scanimng line, as described above. Thus, in this horizontal scanning period, writing is performed at the negative electrode side. As a result, the image signals VID1 to VID6 have a lower voltage than the voltage $LC_{com}$ which is applied to the counter electrode 108. Prior to this, the voltage of the precharge voltage signal NRS in the retrace line period is Vg–. When the precharge control signal NRG becomes the active level, all data lines 114 are precharged to the voltage Vg–.

Similarly, the sampling signals S1, S2, S3, . . . , Sn sequentially become the active level to complete writing into all pixels in the second line.

Similarly, the scanning signals G3, G4, . . . , Gm become active to complete writing into all pixels in the third, fourth, . . . , n-th lines. Consequently, writing is performed into pixels in even-numbered lines from the positive electrode side, whereas writing is performed into pixels in odd-numbered lines from the negative electrode side. Accordingly, writing into all pixels in the first to m-th lines are completed in this vertical scanning period.

Writing is similarly performed in the next vertical scanning period, wherein the writing polarity of each line is reversed. That is, writing is performed into pixels in even-numbered lines from the negative electrode side, whereas writing is performed into pixels in odd-numbered lines from the positive electrode side.

Since the writing polarity of the pixels are reversed every vertical scanning period, no DC component is applied to the liquid crystal 105, which prevents deterioration thereof.

In this drive mode, an image signal sampling time by each sampling switch 151 is six times that in a mode for driving every data line 114. Thus, each pixel has a sufficient writing time. As a result, a high contrast is achieved. Moreover, the step number of the shift register in the data line driving circuit 140 and the frequency of the clock signal CLX are reduced to one-sixth. Therefore, the amount of electrical power that is consumed is reduced, in addition to the reduction in the step number.

In addition, the active period of the sampling signals S1, S2, . . . , Sn is shorter than the half period of the clock signal CLX and is limited to the period SMPa. Thus, overlap between adjoining sampling signals is preliminarily prevented. Accordingly, simultaneous sampling of the image signals VID1 to VID6 to six data lines 114 belonging to a certain block and other six data lines 114 belonging to the subsequent block is prevented, enabling in high-quality display.

Figure 6:
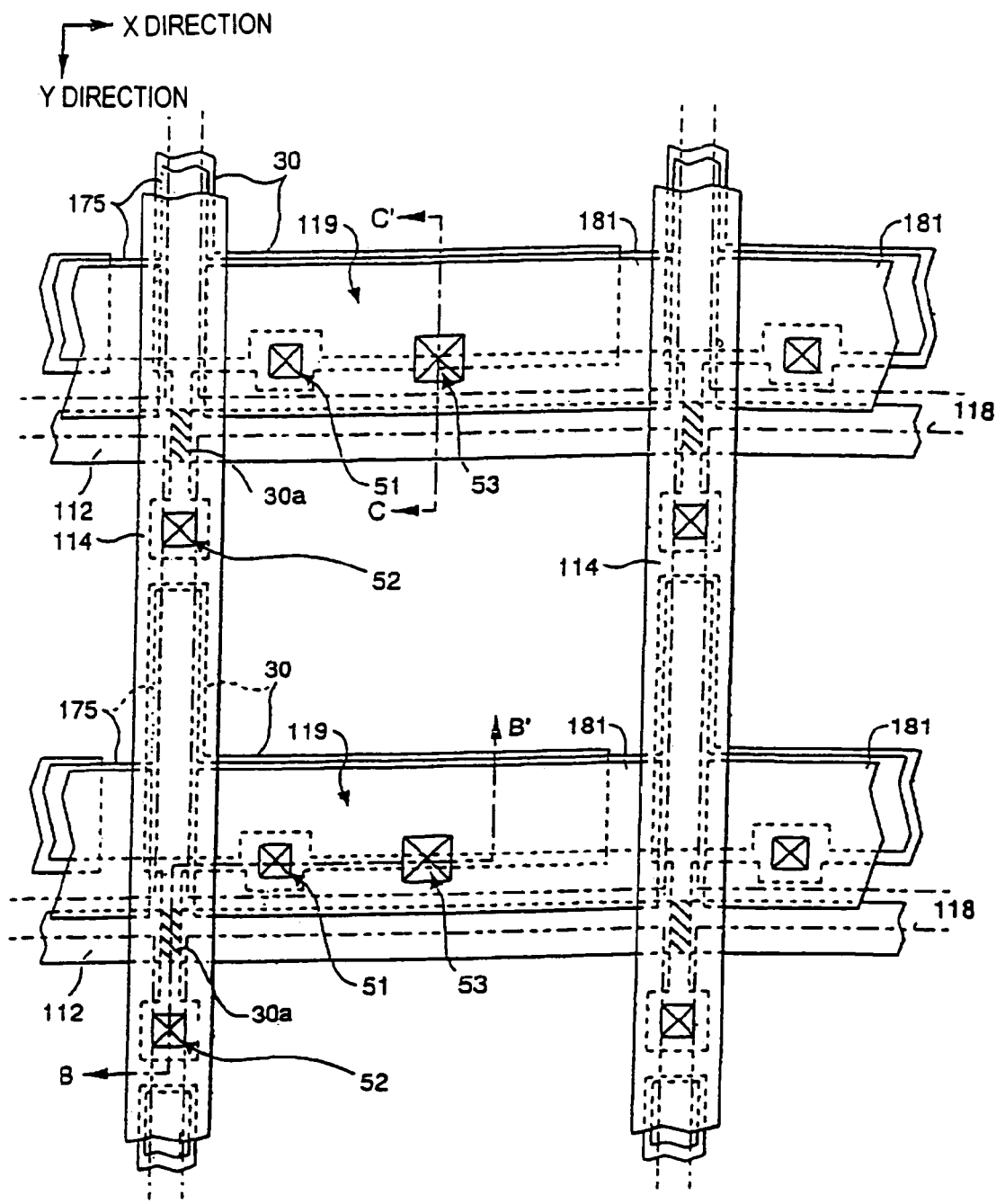
FIG. 6 is a plan view illustrating a detailed pixel configuration in the display region of the liquid crystal device.

The detail of the pixels will be described with reference to FIGS. 6, 7(a), 7(b), and 7(c). FIG. 6 is a plan view illustrating a detailed pixel configuration in the display region and FIG. 7(a) is a cross-sectional view taken from line B–B' in FIG. 6. In FIG. 6, the pixel electrode 118 which is the uppermost conductive layer is depicted by broken lines which represent the contour thereof for convenience.

As shown in FIG. 7(a), a base plate 10 of the device substrate 101 includes a polysilicon semiconductor layer 30 and having an insulating film 40 disposed therebetween. The polysilicon semiconductor layer 30 is covered by an insulating film 32 by thermal oxidation.

As shown in FIG. 6, each data line 114 extends in the Y direction, whereas each scanning lines 112 extends in the X direction. Each capacitor line 175 is provided in the vicinity of the scanning lines 112, these lines being parallel to each other. The capacitor line 175 protrudes towards the precedent step side (towards the upper side in the drawing) at the crossing with the data line 114 so as to overlap with the data line 114.

The semiconductor layer 30 extends from the crossing between the data line 114 and the capacitor line 175 to three directions, that is, the direction (the right side in FIG. 6) of the capacitor line 175, the direction (the upper side in the drawing) of the protruding capacitor line 175, and the direction (the lower side) opposite to the protruding capacitor line 175. Thus, the capacitor line 175 has a T shape and is covered by the data line 114 and the capacitor line 175.

In the semiconductor layer 30, a portion overlapping with the scanning lines 112 functions as a channel region 30a. In other words, the crossing of the scanning lines 112 with the semiconductor layer 30 is used as a gate electrode 116G. The scanning lines 112 including the gate electrode 116G and the capacitor line 175 are formed of, for example, polysilicon, as described below.

The semiconductor layer 30 is provided with a lightly doped source region 30b and a heavily doped source region 116S at the source side of the channel region 30a, and a lightly doped, drain region 30c and a heavily doped drain region 116D at the drain side, and thus has a so-called lightly doped drain (LDD) structure.

The heavily doped source region 116S is connected to the data line 114 composed of aluminum by a contact hole 52 passing through the insulating film 32, a first insulating interlayer 41, and the second insulating interlayer 42.

On the other hand, heavily doped drain region 116D is connected to one end of a conductive interlayer 181 composed of a high-melting-point metal, polysilicon, or the like by a contact hole 51 passing through the insulating film 32 and the first insulating interlayer 41. The other end of the conductive interlayer 181 is connected to the pixel electrode 118 by a contact hole 53 passing through the second insulating interlayer 42 and a third insulating interlayer 43. Accordingly, the pixel electrode 118 is connected to the heavily doped drain region 116D of the TFT 116 via the conductive interlayer 181.

The pixel electrode 118 is connected indirectly to the heavily doped drain region 116D via the conductive interlayer 181, however not directly to the heavily doped drain region 116D due to the following reasons. Since the pixel electrode 118 is an electrode for applying a voltage to the liquid crystal capacitor, this is formed in the vicinity of the liquid crystal 105, whereas the semiconductor layer 30 is formed distant from the liquid crystal 105. When the TFT 116 is of a planar type as in this embodiment, lead layers, such as the scanning lines 112 and the data line 114, and insulating interlayers provided therebetween are deposited between the semiconductor layer 30 and the pixel electrode 118. Thus, the semiconductor layer 30 is inevitably distant from the pixel electrode 118. In a direct connection of the pixel electrode 118 and the heavily doped drain region 116D, a contact hole having a relatively large depth must be formed by, for example, dry etching. However, excess etching during forming such a deep contact hole damages the semiconductor layer 30. Moreover, there is no significant difference in selective ratio between the semiconductor layer 30 and the insulating films, and the thickness of the semiconductor layer 30 is extremely smaller than the thickness of the insulating film to be etched. Such circumstances make the formation of the contact hole more difficult.

Thus, the contact hole 51 is provided at the position corresponding to the heavily doped drain region 116D in the insulating film 32 and the first insulating interlayer 41. Next, the conductive interlayer 181 electrically connected to the sampling switch 151 is formed so that the conductive interlayer 181 functions as a barrier film for the heavily doped drain region 116D. When the contact hole 53 is formed before the formation of the pixel electrode 118, the conductive interlayer 181 which functions as an etching stopper prevents the damage of the semiconductor layer 30 due to excess etching.

As shown in FIG. 6, the conductive interlayer 181 substantially covers the capacitor line 175 between the two adjoining data lines 114, and partially extends on the scanning lines 112 (these are electrically insulated). Moreover, the region which is not provided with the pixel electrode 118 is covered by the data line 114 in the Y direction and the scanning lines 112 and the conductive interlayer 181 in the X direction. The conductive interlayer 181 may be formed of polysilicon, a metal, such as titanium, chromium tungsten, tantalum, molybdenum, or lead, an alloy thereof, or a silicide thereof. Since the shading region in the pixel section is completely defined by the data line 114, the scanning lines 112, and the conductive interlayer 181, the opposite substrate 102 does not require an additional shading film. Since the semiconductor layer 30 is covered by the data line 114, the scanning lines 112, the capacitor line 175, and the conductive interlayer, light from the upper side of the substrate does not enter the TFT 116. A shading film may be provided below the semiconductor layer 30 and between the base plate 10 and the insulating film 40. This shading film prevents invasion of light from the lower side of the substrate into the TFT 116, and thus changes in characteristics of the TFT 116 by light irradiation.

The detailed configuration of a storage capacitor 119 will be described with reference to FIGS. 7(b) and 7(c) in addition to FIGS. 6 and 7(a). FIG. 7(b) is a cross-sectional view taken from line C–C' in FIG. 6, and FIG. 7(c) is an equivalent circuit diagram illustrating the storage capacitor 119.

In the semiconductor layer 30, a region 30f adjoining the heavily doped drain region 116D has low resistance by heavy doping and has an L shape below the capacitor line 175 in a plan view. The conductive interlayer 181 covers the capacitor line 175 in the X direction via the first insulating interlayer 41, as described above. Thus, the storage capacitor 119 consists of two capacitors connected in parallel as shown in FIG. 7(b) or 7(c). In detail, the storage capacitor 119 consists of a first capacitor defined by the region 30f as one electrode, the capacitor line 175 as the other electrode, and the insulating film 32 formed on the surface of the semiconductor layer 30 therebetween, and a second capacitor defined by the conductive interlayer 181 as one electrode, the capacitor line 175 as the other electrode, and the first insulating interlayer 41 therebetween. As described above, the first and second capacitors are connected in parallel. Since the storage capacitor 119 has larger capacity than that of a single capacitor, the retention property of the liquid crystal capacitor is improved, resulting in high-quality display.

An alignment film 61 composed of an organic compound such as polyimide or the like is formed on the entire uppermost layer (namely, on the surface adjacent to the liquid crystal 108) and is subjected to rubbing treatment before bonding with the opposite substrate 102.

The peripheral circuit will be described in detail with reference to a partial region of the sampling circuit 150 and a partial region of the scanning line driving circuit 130. The active elements and leads constituting the peripheral circuit is formed by a common process together with the TFT 116, the scanning lines 112 (and the capacitor line 175), the conductive interlayer 181, and the data line 114 in the peripheral region, as described in detail in a subsequent production process.

In a display region 101a, the leads are formed in the order of the scanning line 112 (and the capacitor line 175), the conductive interlayer 181, and the data line 114. Among the leads in the peripheral circuit, leads composed of the conductive layer constituting the scanning lines 112 are referred to as first layer leads, leads composed of the conductive layer constituting the conductive interlayer 181 are referred to as second layer leads, and leads composed of the conductive layer constituting the data line 114 are referred to as third layer leads. Since the conductive layer constituting the conductive interlayer 181 is not provided in conventional peripheral circuits, the third layer leads in this embodiment correspond to second layer leads in conventional electro-optical devices.

When the three layer leads of the first to third layer leads are used in the peripheral circuit, the design versatility of the peripheral circuit is remarkably improved compared to conventional peripheral circuit including only two layer leads. Moreover, the second layer leads contribute to reduced wiring resistance and a reduced circuit forming region.

A region of the sampling circuit 150 will be described with reference to FIGS. 8(a) and 8(b). In this description, the relationship between the sampling signal Sj which is output corresponding to the j-th block and the line from the six image signal lines 122 to the six data lines 114 belonging to this block is mainly described. Further, j is provided for describing the block as in FIG. 2 and is an integer of 1 to n.

FIG. 8(a) is a plan view illustrating a detailed configuration in this region. The sampling signal Sj output from the data line driving circuit 140 flows in a third layer lead 391, a lower layer lead 191, a third layer lead 393, and six first leads 412. These leads are connected to each other via contact holes, and the first leads 412 function as gate electrodes of TFTs constituting the sampling switches 151.

The image signal VID1, among the image signals VID1 to VID6, is supplied via the following path. The image signal VID1 is supplied to the source region of the TFT constituting the sampling switch 151 via the image signal lines 122 of the third layer, an underlayer lead 193, a third layer lead 395, an underlayer lead 195, and a third layer lead 397. The other image signals VID2 to VID6 are also supplied to the source regions of the TFTs constituting the sampling switches 151 via similar paths. The drain region of the TFT constituting the sampling switch 151 is connected to the data line 114 of the third layer.

As described above, the third layer leads are basically used in various leads in the sampling circuit 150. Exceptionally, the underlayer leads are used at the crossing with the third layer lead and are used as the gate electrode.

The cross-sectional structure taken along line D–D' in FIG. 8(a) will now be described with reference to FIG. 8(b). As shown in the drawing, the underlayer lead 193 which is branched from the image signal lines 122 for supplying the image signal VID1 and crosses the other image signal lines 122 has a parallel lead structure. The lead structure includes a first layer lead 112b and a second layer lead 181b which are connected to each other in parallel. More specifically, the both ends of the second layer lead 181b are connected to the first layer lead 112b in parallel via contact holes $55_1$ and $56_1$ passing through the first insulating interlayer 41. Moreover, the image signal line 122 supplying the image signal VID1 is connected to the second layer lead 181b via a contact hole $56_1$ which is provided at the same position as that for the contact hole $55_1$, whereas the third layer lead 395 is connected to the second layer lead 181b via a contact hole $56_2$ which is provided at the same position as that for the contact hole $56_1$.

Similarly, in the underlayer leads 193, which are branched from the image signal limes 122 for supplying the image signals VID2 to VID6, the first layer lead 112b and the second layer lead 181b are connected to each other in parallel. Also, in the underlayer leads 193 branched from and crossing the image signal lines 122 and the underlayer leads 195 crossing the third layer lead 393 for supplying the sampling signal Sj, each first layer lead 112c and each second layer lead 181c are connected to each other in parallel.

A reason that the parallel wiring including the first layer lead and the second layer lead in the underlayer lead 193 and the underlayer lead 195 of the sampling circuit 150 is employed in this embodiment is as follows. Since the image signals VID1 to VID6 are analog signals which are applied to the pixel electrodes 118 and define the display state directly, it is preferable that the resistance of the flowing path be low as much as possible. Thus, the image signal lines 122 are composed of the aluminum third layer. However, a part of the lead branched therefrom is inevitably formed of a layer other than the third layer. A lead of a conductive layer constituting the scanning lines 112, that is, the first layer lead is used as this part in conventional art. Since the first layer is composed of polysilicon or the like, this layer has remarkably high resistance compared to aluminum constituting the third layer. Thus, the effect of the resistance of the first layer is significant, even if the length of the first layer lead is extremely small.

In this embodiment, the second layer, which is used in the display region, is also used at a portion which must be composed of a layer other than the third layer in the peripheral circuit region, and the lead of the second layer and the lead of the first layer are connected to each other in parallel. Thus, the resistance in this part is reduced to approximately a half that in the case of a single-layer lead. Accordingly, the image signals VID1 to VID6 are supplied to the data lines 114 without waveform distortion and voltage drop in the supply path, resulting in satisfactory display.

As shown in FIG. 8(a), the underlayer leads 193 which are branched from the image signal lines 122 have substantially the same length and width, over the image signals VID1 to VID6. This configuration can be employed so that the underlayer leads 193 have the same resistance over the image signals VID1 to VID6, because the underlayer lead 193 has resistance which is still larger than that of the third layer lead regardless of the parallel connection of the first layer lead 112b and the second layer lead 181b for reducing the resistance thereof in this embodiment.

The lower layer lead 191 which supplies the sampling signal Sj and crosses the image signal lines 122 also has a parallel connection structure of the first layer lead and the second layer lead, although this lead is outside of the supply paths for the image signals VID1 to VID6. The supply path for the sampling signal Sj is also required for low resistance as much as possible in order to prevent delay due to waveform distortion of the sampling signal Sj.

As described above, the third layer lead with low resistance is basically used in various leads in the sampling circuit 150 in this embodiment, whereas a parallel lead including the first layer lead and the second layer lead is used at the position which cross the third layer lead. In the overall peripheral circuit, there are many portions in which parallel leads must be used, in addition to the leads 191, 193, and 195 in the sampling circuit 150. For example, a precharge control line 163 in FIG. 2 is branched to gate electrodes of TFTs constituting the precharge switches 161 and the branches have portions which cross a precharge voltage signal line 165. Moreover, the capacitor lines 175 are formed of the first layer leads which are the same as that for the scanning lines 112 in the display region 100a, but must be formed of the third layer leads in other regions, since the capacitor lines 175 extend from a mounting terminal 107 and are commonly connected.

As shown in FIG. 2, the precharge control line 163 and the precharge voltage signal line 165 inevitably have crossings with the capacitor lines 175. In the scanning line driving circuit 130, the power supply voltages VddY and VssY, the clock signal CLY, and the reversed clock signal $CLY_{inv}$ must be supplied to the unit circuit constituting the shift register. Thus, the branches from the main lines for the clock signal CLY and the reversed clock signal $CLY_{inv}$ have crossings with leads for supplying the power supply voltages VddY and VssY. Similarly, in the data line driving circuit 140, the power supply voltages VddX and VssX, the clock signal CLX, and the reversed clock signal $CLX_{inv}$ must be supplied to the unit circuit constituting the shift register, and the power supply voltages VddX and VssX, the enable signals ENB1 and ENB2 must be supplied to the corresponding AND circuit. Thus, the branches from the main lines for the clock signal CLX and the reversed clock signal $CLX_{inv}$ and the branches from the main line for the enable signals ENB1 and ENB2 have crossings with leads for supplying the power supply voltages VddY and VssY. Accordingly, the use of the parallel lead including the first layer lead and the second layer lead connected in parallel to each other in the crossings with the third layer leads reduces resistance thereof.

A region of the scanning line driving circuit 130 will now be described with reference to FIG. 9(a) and 9(b). FIG. 9(a) is a plan view illustrating a partial configuration of the scanning line driving circuit 130, and FIG. 9(b) is an equivalent circuit diagram thereof. In the drawings, a circuit for transmitting the transmission-initiation pulse DY according to the clock signal CLY and the reversed clock signal $CLY_{inv}$ is partly depicted from the shift register constituting the scanning line driving circuit 130.

As shown in FIG. 9(a), the scanning line driving circuit 130 uses the first layer lead, the second layer lead, and the third layer lead. Also, in this region, the third layer lead is basically used. Exceptionally, the first layer lead is used at portions crossing the third layer lead and at portions used as the gate electrodes, and the second layer lead 181*d* is used in a part of a lead from the source electrode of a TFT to the drain electrode of another TFT. In particular, in a region 132, a first layer lead 112*d*, the second layer lead 181*d*, and a third layer lead 114*d* are deposited with insulating interlayers (not shown in the drawing) provided therebetween.

In the scanning line driving circuit 130, the second layer lead 181*d* is used alone and these three leads can be formed in the same region, unlike the above sampling circuit 150, due to the following reason. Since the scanning line driving circuit 130 supplies the sampling signals S1, S2, . . . , Sn to every six data lines 114, the unit circuit and the AND circuit of the shift register constituting the scanning line driving circuit 130 can have a pitch up to 6 times the data line pitch in FIG. 8(*a*). On the other hand, the scanning line driving circuit 130 supplies the scanning signals G1, G2, . . . , Gm to each of m scanning lines 112. Thus, the unit circuit and the AND circuit in the shift register constituting the data line driving circuit 140 must have a pitch which is equal to the scanning line pitch in FIG. 9(*a*). Accordingly, the unit circuit and the AND circuit in the scanning line driving circuit 130 must be formed in a narrower region compared to the data line driving circuit 140. If the three lines are formed of the first layer and the third layer without using the second layer lead 181*d*, one lead must be formed of the first layer and the other two leads must be formed of the third layer. However, the two third layer leads cannot be formed by overlapping in the same region. Since the two third layer leads must be formed in different regions, a wider region must be provided. Accordingly, such a configuration does not meet the requirement in which the unit circuit and the AND circuit constituting the scanning line driving circuit 130 must be formed in a narrower region. In contrast, in this embodiment, using the second layer lead 181*d* alone, the first layer lead 112*d*, the second layer lead 181*d*, and the third layer lead 114*d* are deposited and insulated with insulating interlayer provided therebetween to reduce the width of the region which is necessary for the formation of the circuit.

A parallel lead including the first layer lead and the second layer lead may be used at a portion which does not require a narrow region for the formation of the circuit and must cross the third layer lead in the scanning line driving circuit 130.

The production process of the electro-optical device in accordance with the present invention will now be described with reference to mainly the display region and the peripheral circuit region of the device substrate 101. As the peripheral circuit region, a region in the vicinity of the underlayer lead 193 which is branched from one image signal line 122 and crosses another image signal line 122 in FIG. 8(*b*) is shown as an example.

With reference to FIG. 10(1), an underlying insulating film 40 is formed on a base plate 10, such as a quartz substrate, a glass substrate, or a silicon substrate. More specifically, the underlying insulating film 40 composed of highly insulating glass, such as non-doped silicate glass (NSG), phosphosilicate glass (PSG), borosilicate glass (BSG), or borophosphosilicate glass (BPSG), or a silicon oxide film or a silicon nitride film is formed by, for example, a normal pressure or reduced pressure chemical vapor deposition (CVD) process so as to have a thickness in the range of approximately 50 to 1,500 nm and preferably approximately 600 to 800 nm.

An amorphous silicon layer with a thickness of approximately 100 nm is formed on the entire surface of the underlying insulating film 40 by, for example, a reduced pressure CVD process and is heat-treated to form a polysilicon layer by solid-phase growth. When an N-channel type TFT is formed, the layer is slightly doped with a Group V dopant, such as antimony, arsenic, or phosphorus by ion implantation or the like. When a P-channel type TFT is formed, the layer is slightly doped with a Group III dopant, such as aluminum, boron, or gallium by ion implantation or the like. As shown in FIG. 10(2), the polysilicon layer is patterned by photolithography or etching to form islands of semiconductor layers 30 of the TFTs 116. In the entire peripheral circuits, semiconductor layers of TFTS constituting the scanning line driving circuits 130, the data line driving circuit 140, the sampling circuit 150, the precharge circuit 160 are also similarly formed. Among the semiconductor layer 30 of each TFT 116, a region 30*f* for forming the capacitor line 175 may be heavily doped with a dopant such as phosphorus to reduce resistance.

Figure 11:
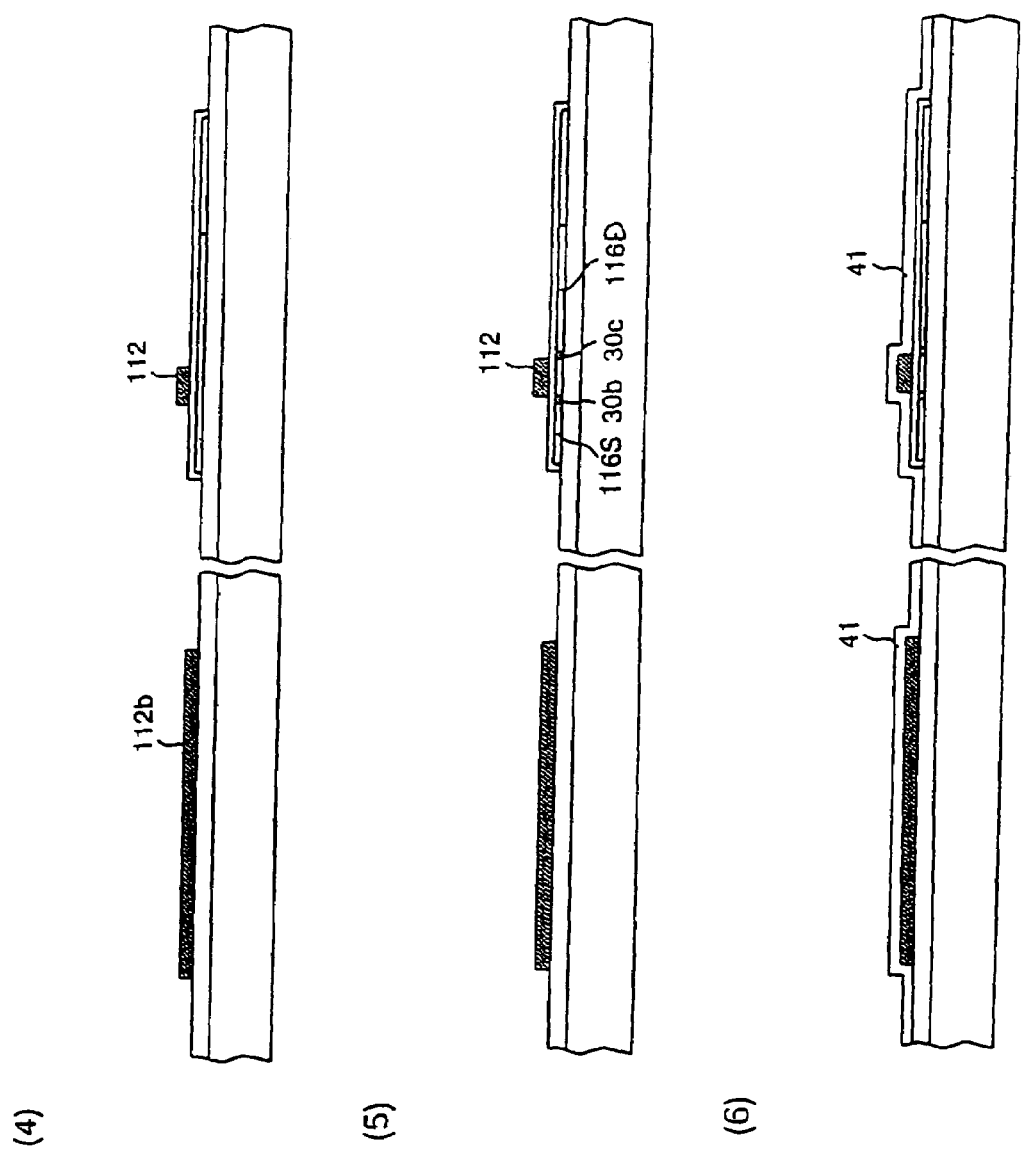
FIGS. 11(4) to 11(6) are cross-sectional views illustrating production steps of the device substrate of the liquid crystal panel.

Next, a polysilicon layer is deposited on the insulating film 32 and the underlying insulating film 40 by a reduced-pressure CVD process or the like. As shown in FIG. 11(4), the polysilicon layer is patterned by photolithography or etching to form scanning lines 112, which also function as gate electrodes of the TFTs 116, and capacitor lines 175, which works as the other electrodes of storage capacitors 119, in the display region, and to form leads 112*b* among the parallel leads 193 in the peripheral circuit region. In summary, the first layer leads including the gate electrodes are formed in the entire peripheral circuit.

Next, as shown in FIG. 11(5), the semiconductor layer 30 is doped with an appropriate dopant. Specifically, in N-channel-type TFTs 116 in the display region, areas adjoining the channel regions 30*a* of the source-drain regions are lightly doped with a Group V dopant such as P through diffusion masks of the gate electrodes which are parts of the scanning lines 112. Also, in N-channel-type TFTs in the entire peripheral circuit, predetermined areas are lightly doped with the dopant through diffusion masks of the gate electrodes which are parts of the first layer leads. Next, resist layers which are wider than the gate electrodes are formed, and these areas are heavily doped with a Group V dopant such as P through the resist layers as masks.

The N-channel-type-TFTs have each an LDD structure including a lightly doped source region 30*b* and a heavily doped drain region 116D at the source side in the channel region 30*a*, and a lightly doped drain region 30*c* and a heavily doped drain region 116D at the drain side. Although not shown in the drawing, the insulating layers 30 of these N-channel-type TFTs are masked with a resist, and areas adjoining the channel regions of P-channel-type TFTs in the entire peripheral circuit are lightly doped with a Group III dopant such as B (boron) through the diffusion mask of the gate electrodes which are parts of the first layer leads to form lightly doped regions and then heavily doped with a Group III dopant such as B through a resist mask which is wider than the gate electrodes to form heavily doped region. Each channel-type TFT may be an offset-type TFT or a self-alignment-type TFT, instead of the LDD structure.

Next, as shown in FIG. 11(6), a first insulating interlayer 41 is deposited by a CVD process or the like to cover the scanning line 112, the first layer lead 112*b*, the semiconductor layer 30, and the underlying insulating film 40. The first insulating interlayer 41 may be a silicate glass film, e.g., NSSG, PSC, BSG, or BPSC, a silicon nitride film, or a silicon oxide film, as in the underlying insulating film 40.

As shown in FIG. 12(7), a contact hole 51 is formed in the display region, and contact holes $55_1$ and $56_1$ for connection to the first layer lead 112b are formed in the peripheral circuit region, by dry etching or the like. More specifically, the contact hole 51 is formed at a position corresponding to the heavily doped drain region 116D of the TFT 116 so as to pass through the first insulating interlayer 41 and the insulating film 32, whereas the contact holes $55_1$ and $56_1$ are formed at both ends of the first layer lead 112b so as to pass through the first insulating interlayer 41. When the first layer lead and the second layer lead are connected to each other in the overall peripheral circuit, a contact hole (not shown in the drawing) is also formed at this connection.

Next, a conductive film of a high-melting-point metal, a metal silicide, or polysilicon is deposited on the first insulating interlayer 41 by sputtering or the like so as to have a thickness of approximately 50 to 500 nm and preferably approximately 200 nm. Of course, the conductive layer may have a multilayer configuration including the high-melting-point metal, the metal silicide, and the polysilicon. The stress relaxation of the conductive layer and a reduction in resistance of the contact holes are thereby achieved. As shown in FIG. 12(8), this conductive layer is patterned by photolithography or etching to form a conductive interlayer 181 which is connected to the heavily doped drain region 116D of the TFT 116 in the display region and to form the other second layer lead 181b of the parallel lead 193 in the peripheral circuit region. That is, the second layer lead is formed in the entire peripheral circuit.

As shown in FIG. 12(9), a second insulating interlayer 42 with a thickness of approximately 500 to 1,500 nm is formed by a CVD process or the like to cover the conductive interlayer 181, the second layer lead 181b, and the first insulating interlayer 41. The second insulating interlayer 42 may be a silicate glass film, e.g., NSG, PSC, BSG, or BPSG, a silicon nitride film, or a silicon oxide film, as in the underlying insulating film 40 and the first insulating interlayer 41.

As shown in FIG. 13(10), a contact hole 52 is formed in the display region, and contact holes $55_2$ and $56_2$ for connection to the second layer lead 181b are formed in the peripheral circuit region. More specifically, the contact hole 52 is formed at a position corresponding to the heavily doped source region 116S of the TFT 116 so as to pass through the second insulating interlayer 42, the first insulating interlayer 41, and the insulating film 32, whereas the contact holes $55_2$ and $56_2$ are formed on both ends of the second layer lead 181b so as to pass through the second insulating interlayer 42. When the second layer lead and the third layer lead are connected to each other in the overall peripheral circuit, a contact hole (not shown in the drawing) is also formed at this connection.

Next, a conductive film of a low-resistance metal such as aluminum is deposited on the second insulating interlayer 42 provided with the contact holes 52, $55_2$, and $56_2$ by sputtering or the like so as to have a thickness of approximately 50 to 500 nm. As, shown in FIG. 13(11), this conductive layer is patterned by photolithography or etching to form data line 114 which also functions as a source electrode of the TFT 116, in the display region and to form a lead 391 and image signal lines 122 in the peripheral circuit region. That is, the third layer leads are formed in the entire peripheral circuit.

As shown in, FIG. 13(12), a third insulating interlayer 43 with a thickness of approximately 500 to 1,500 nm is formed by a CVD process or the like to cover the third layer leads, such as the data line 114 and the image signal lines 122. The third insulating interlayer 43 may be a silicate glass film, e.g., NSG, PSG, BSG, or BPSG, a silicon nitride film, or a silicon oxide film, as in the underlying insulating film 40, the first insulating interlayer 41, and the second insulating interlayer 42.

As shown in FIG. 14(13), a contact hole 53 is formed at a predetermined position on the conductive interlayer 181 so as to pass through the third insulating interlayer 43 and the second insulating interlayer 42 by dry etching or the like.

With reference to FIG. 14(14), a transparent conductive film, such as an indium tin oxide (ITO), film with a thickness of approximately 50 to 200 nm, is deposited on the surface of the third insulating interlayer 43 provided with the contact hole 53 by sputtering or the like and then is patterned into a predetermined shape (see FIG. 5) by photolithography, etching, or the like to form a pixel electrode 118. In the subsequent steps (not shown in the drawing), an organic solution including polyimide etc. is applied to the entire opposing face provided with the pixel electrode 118 and the third insulating interlayer 43 of the base plate 10 and is baked. An alignment film 61 is thereby formed. The alignment film 61 is subjected to rubbing treatment in a predetermined direction.

The resulting device substrate 101 is bonded to the opposite substrate 102 which is subjected to rubbing treatment in a direction which is substantially perpendicular to the direction in the device substrate 101 with a sealant 104, and then liquid crystal 105 is enclosed followed by sealing to complete the electro-optical device shown in FIG. 1.

The alignment film 61 is formed on the entire device substrate 101, and the alignment film formed in the peripheral circuit region protruding from the opposite substrate 102 is removed after the sealing of the liquid crystal by a plasma treatment or the like Thus, the uppermost layer in the peripheral circuit region is not the alignment film 61 but the third insulating interlayer 43.

According to such a production process, the same conductive film as the conductive interlayer 181 which is used as a barrier film for the heavily doped drain region 116D of the TFT 116 in the display region can be also used as the second layer leads in the peripheral circuit without providing additional steps. Moreover, the use of the three layer leads significantly improves design versatility in the peripheral circuit. In addition, the parallel connection of the second layer lead with the first layer lead can reduce resistance thereof, and the use of the second layer lead alone facilitates the formation of a triple-layer lead in the same region.

While the above disclosure describes particular embodiments of the electro-optical device in accordance with the present invention, it is to be understood that various modifications to the device can be made without departing from the spirit and scope of the present invention.

When the third layer lead is connected to the parallel lead of the first layer lead and the second layer lead in the above embodiments, the third layer lead is connected to the second layer lead. For example, FIG. 8(b), the image signal line 122 is connected to the second layer lead 181b of the underlayer lead 193.

When the conductive layer of the second layer is composed of a high-melting-point metal or the like which readily generate stress (warp), the second insulating interlayer 42 may crack due to stress concentration during forming the contact holes $55_2$ and $56_2$ for connection to the lead 181b of such a high-melting-point metal. By exposing the second layer lead 181b at the contact holes $55_2$ and $56_2$, exhalation of impurities from the second layer lead 181b may cause defects.

When the third layer lead is connected to one end of the parallel lead 193 including the first layer lead 112b and the second layer lead 181b, as shown in FIG. 15(a), it is preferable that the second layer lead 181b be connected to the first layer lead 112b via contact holes $57_1$ and $58_1$ provided at a slightly inner side to form a parallel lead 193, whereas the third layer lead be connected to the first layer lead 112b via contact holes $57_2$ and $58_2$ provided at the outer side. In this configuration, the conductive interlayer 181 is not exposed after the second insulating interlayer 42 is formed. Since no stress is generated during forming the contact holes, the second insulating interlayer 42 does not crack and no impurity exhales from the second layer lead 181b.

Although the parallel lead 193 has connections only at both ends of the first layer lead 112b and the second layer lead 181b, contact holes 58 and 59 may be provided, as shown in FIG. 15(b), at one or more positions other than the both ends to ensure connections between these leads. The connection between the first layer lead 112b and the second layer lead 181b may be achieved by one or more contact holes other than the both ends as described above or by connection of the third layer lead to the first layer lead 112b via an outer contact hole.

In the above embodiment, six data lines 114 are treated as one block, and image signals VID1 to VID6 converted into six systems are simultaneously sampled and supplied to the six data lines 114 belonging to one block. However, it is to be understood that the number of the conversions and the number of the data lines for simultaneously applying the signals are not limited to six. For example, when the sampling switches 151 in the sampling circuit 150 have sufficiently high response speeds, the image signal can be serially transmitted to one image signal line without parallel conversion of the image signal to sample the image signals dot-sequentially every data line 114. Since the shift register and the AND circuit constituting the data line driving circuit 140 must have the same pitch as the data line pitch in such a configuration, it may be necessary that the second layer lead is used alone, as in the scanning line driving circuit 130.

The number of the conversions and the number of the data lines which may be subjected to simultaneous signal application may be, for example, 3, 12, or 24 so that image signals which are converted into 3 systems, 12 systems, or 24 systems, respectively, are simultaneously supplied to 3, 12, or 24 data lines, respectively. In connection with color image signals according to three primary colors, the number of the conversion and the number of the data lines are preferably a multiple number of three to simplify the control and the circuit. In the use thereof in mere light modulation, for example, in a projector described below, the number is not necessarily a multiple number of three. Instead of simultaneous control of plural sampling switches, the parallel-converted image signals VID1 to VID6 maybe shifted and be sequentially supplied to sequentially control the sampling switches 151.

In the above embodiments, the scanning lines 112 are scanned from the top to the bottom while the blocks are selected from the left to the right. These may be driven in the reverse order or in one direction, according to the use.

In the above embodiments, although the device substrate 101 is provided with the planar TFTs 116, it is to be understood that the present invention is not limited to this configuration. For example, the TFTs 116 may be of a bottom gate type. Alternatively, the device substrate 101 may be composed of a semiconductor base plate and field emission transistors may be formed in place of the TFTs 116.

Moreover, using a silicon-on-insulator (SOI) technology, a monocrystalline silicon film may be formed on an insulating base plate of sapphire, glass, quartz etc. in order to form the device substrate 101 provided with various elements. When the device substrate 101 is not transparent, the liquid crystal panel 100 must be used as a reflective type by forming the pixel electrode 118 with aluminum or by providing a reflective layer.

In the above embodiments, the TN liquid crystal is used. Instead, the liquid crystal may be of a bi-stable twisted nematic (BTN) type, a writable bi-stable type such as a ferrodielectric type, a polymer dispersion type, a guest-host type which a dye (guest) having anisotropic visible light absorbency in the long axis and the short axis of molecules is dissolved in a liquid crystal (host) having a predetermined molecular arrangement so that the dye molecules and the liquid crystal molecules are arranged in parallel.

Moreover, the configuration may be a vertical (homeotropic) alignment in which the liquid crystal molecules are arranged perpendicular to the both substrates when no voltage is applied and parallel to the both substrate when a voltage is applied, or may be a parallel (homogeneous) alignment in which the liquid crystal molecules are arranged parallel to the both substrates when no voltage is applied and perpendicular to the both substrate when a voltage is applied. Accordingly, the present invention can be applied to various types of liquid crystals and alignment systems.

In addition, the present invention is applicable to various electro-optical devices for performing display by electro-optical effects using electroluminescence (EL), plasma emission, or fluorescence by electron emission, in addition to the liquid crystal device. Examples of the electro-optical materials are EL substances, mirror devices, gases, and fluorescent materials. When an EL substance is used as the electro-optical material, the EL substance is disposed between the pixel electrodes 118 and the counter electrode 108 of a transparent conductive film in the device substrate 101. Thus, the opposite substrate 102 is unnecessary. Accordingly, the present invention can be applied to all electro-optical devices having configurations which are similar to the above configurations without departing from the spirit and scope of the present invention.

<Electronic Apparatus>

Several electro-optical devices using the electro-optical device in accordance with the above embodiments will now be described.

Figure 16:
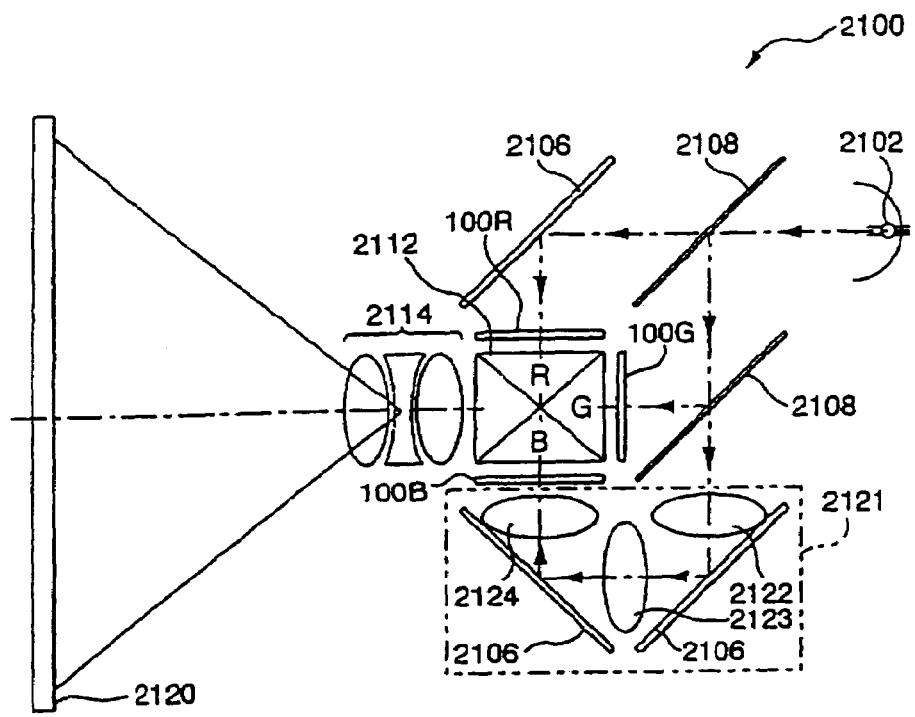
FIG. 16 is a plan view illustrating a projector which is en embodiment of an electronic apparatus using the electro-optical device of the present invention.

First, FIG. 16 is a plan view illustrating a projector using the above liquid crystal panel 100 as a light valve. As shown in this drawing, the projector 2100 is provided with a lamp unit 2102 having a white light source, such as a halogen lamp therein. Projection light emitted from the lamp unit 2102 is divided into three primary color beams (R, G, and B) by three mirrors 2106 and two dichroic mirrors 2108, and the three primary color beams are introduced to light valves 100R, 100G, and 100B. The configuration of the light valves 100R, 100G, and 100B is the same as that of the liquid crystal panel 100 in accordance with the above embodiments and are driven by R, G, B primary signals, respectively, which are supplied from a processing circuit (not shown in the drawing) for the image signals. Since the blue (B) light has an optical path which is longer than that of the red (R) light and the green (G) light, this light is introduced via a relay lens system 2121 including an incident lens 2122, a relay lens 2123, and an emission lens 2124 in order to prevent optical loss.

Light beams modulated by the light valves 100R, 100G, and 100B are incident on a dichroic prism 2112 from the three directions. In the dichroic prism 2112, the R light beam and the B light beam are reflected by 90° while the G light beam passes through straight. After a color image is synthesized from these colors, the color image is projected onto a screen 2120 through a projection lens 2114.

Since the R, G, B light beams are incident on the light valves 100R, 100G, and 100B, respectively, through the dichroic mirrors 2108, no color filter is provided as described above. The transmitted images from the light valves 100R and 100B are reflected by the dichroic mirror 2112 and are projected whereas the transmitted image from the light valve 100G is directly projected. Thus, the images from the light valves 100R and 100B are mirror-reversed with respect to the image from the light valve 100G.

Figure 17:
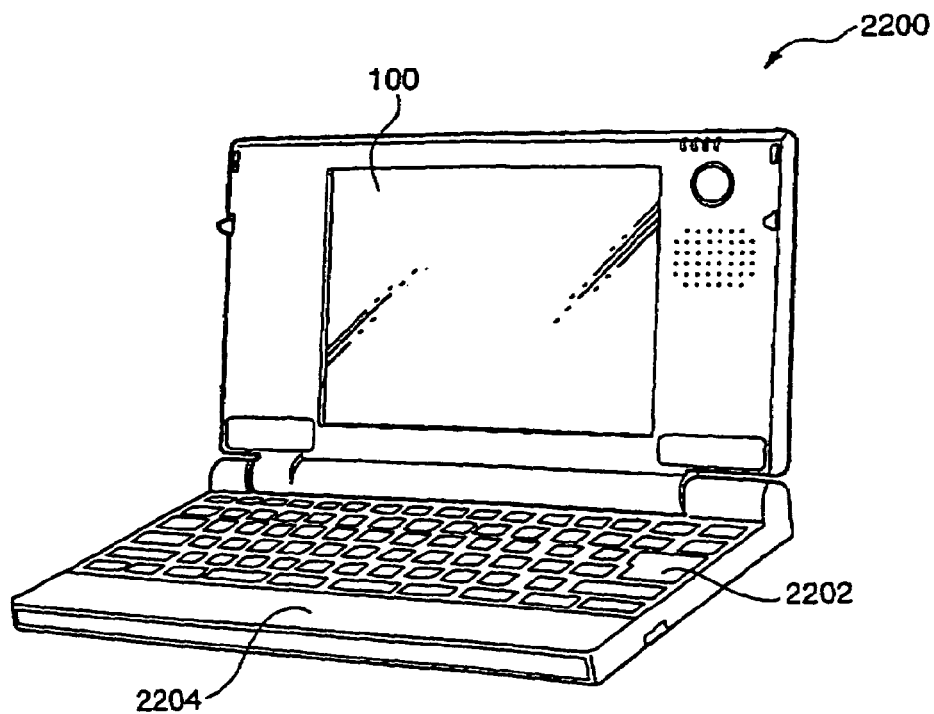
FIG. 17 is an isometric view of a personal computer which is another embodiment of the electronic apparatus according to the present invention.

FIG. 17 is an isometric view of an example in which the above liquid crystal panel 100 is applied to a mobile personal computer. In the drawing, the computer 2200 is provided with a body 2204 including a keyboard 2202 and a liquid crystal panel 100 used as a display section. The liquid crystal panel 100 is provided with a back light (not shown in the drawing) at the back face thereof for enhancing visibility.

Figure 18:
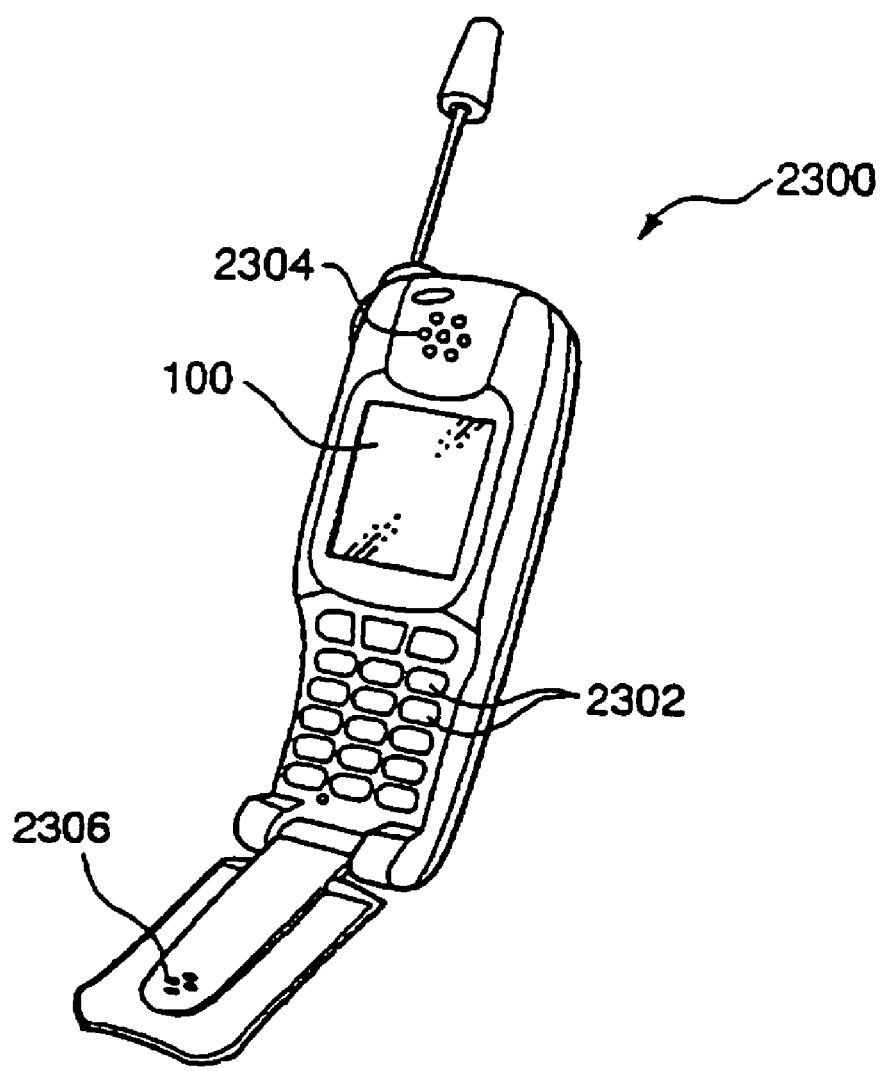
FIG. 18 is an isometric view of a portable phone which is another embodiment of the electronic apparatus.

FIG. 18 shows an example in which the above liquid crystal panel 100 is applied to a display section of a portable phone. In the drawing, the portable phone 2300 is provided with a plurality of operation keys 2302, an ear piece 2304, a mouthpiece, and the above mentioned liquid crystal panel 100. This liquid crystal panel 100 is also provided with a backlight unit (not shown in the drawing) at the back face thereof for improving the visibility.

Examples of electro-optical devices other than the devices shown in FIGS. 16, 17, and 18 include, but are not limited to, liquid crystal television sets, view-finder-type and monitoring-type video tape recorders, car navigation systems, pagers, electronic notebooks, portable calculators, word processors, workstations, TV telephones, digital still cameras, and devices provided with touch panels. Of course, the electro-optical device in accordance with the above embodiments and modifications can be applied to these electronic apparatuses.

According to the present invention, as described above, leads which are composed of the same conductive layer as the conductive interlayers used for connection between one end of each switching element and the pixel electrode in the display region can be used. Thus, design versatility of the peripheral circuit is improved.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. An electro-optical device, comprising:
a substrate;
a plurality of scanning lines and a plurality of data lines;
a combination of a first thin film transistor, a storage capacitor having capacitor line and a pixel electrode provided corresponding to each crossing between the scanning lines and the data lines;
a conductive interlayer electrically connected between the first thin film transistor and a pixel electrode, gate electrode, the conductive interlayer and the data line being disposed in this order above the substrate;
a precharge circuit precharging a precharge signal to the corresponding data line in response to a precharge control signal supplied from a precharge control line; and
a first lead formed by the same film as the conductive interlayer, the first lead electrically connected to the precharge control line, and crossing the capacitor line.

2. The electro-optical device according to claim 1, the first lead being connected to a second lead composed of a gate electrode of thin film transistors constituting sampling switches through a contact hole so that the first lead and the second lead are connected to each other in parallel.

3. The electro-optical device according to claim 1, the precharge control line and the capacitor line being formed by the same film as the data line.

4. An electronic apparatus comprising an electro-optical device according to claim 1.

5. An electro-optical device, comprising:
a substrate;
a plurality of scanning lines and a plurality of data lines;
a combination of a first thin film transistor, a storage capacitor having capacitor line and a pixel electrode provided corresponding to each crossing between the scanning lines and the data lines;
a conductive interlayer electrically connected between the first thin film transistor and a pixel electrode, gate electrode, conductive interlayer and the data line being disposed in this order above the substrate;
a precharge circuit precharging a precharge signal from a precharge signal line to the corresponding data line in response to a precharge control signal supplied from a precharge control line; and
a third lead formed by the same film as the conductive interlayer, the third lead electrically connected to the precharge signal line, and crossing the capacitor line.

6. The electro-optical device according to claim 5, the third lead being connected to a fourth lead composed of a gate electrode of thin film transistors constituting sampling switches through a contact hole so that the third lead and the fourth lead are connected to each other in parallel.

7. The electro-optical device according to claim 5, the precharge signal line and the capacitor line being formed by the same film as the data line.

8. An electronic apparatus comprising an electro-optical device according to claim 5.

9. An electro-optical device, comprising:
a plurality of scanning lines and a plurality of data lines;
a combination of a first thin film transistor, a storage capacitor having capacitor line and a pixel electrode provided corresponding to each crossing between the scanning lines and the data lines;
a conductive interlayer electrically connected between the first thin film transistor and a pixel electrode;
a precharge circuit precharging a precharge signal to the corresponding data line in response to a precharge control signal supplied from a precharge control line;
a first lead formed by the same film as the conductive interlayer, the first lead electrically connected to the precharge control line, and crossing the capacitor line; and
the precharge control line and the capacitor line being formed by the same film as the data line.

10. An electro-optical device, comprising:
a plurality of scanning lines and a plurality of data lines;
a combination of a first thin film transistor, a storage capacitor having capacitor line and a pixel electrode provided corresponding to each crossing between the scanning lines and the data lines;

a conductive interlayer electrically connected between the first thin film transistor and a pixel electrode;

a precharge circuit precharging a precharge signal from a precharge signal line to the corresponding data line in response to a precharge control signal supplied from a precharge control line;

a third lead formed by the same film as the conductive interlayer, the third lead electrically connected to the precharge control line, and crossing the capacitor line; and the precharge signal line and the capacitor line being formed by the same film as the data line.

* * * * *